United States Patent
Okada

(10) Patent No.: US 8,527,722 B1
(45) Date of Patent: Sep. 3, 2013

(54) SELECTING A SNAPSHOT METHOD BASED ON CACHE MEMORY CONSUMPTION

(75) Inventor: Wataru Okada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/509,438

(22) PCT Filed: Apr. 24, 2012

(86) PCT No.: PCT/JP2012/002790
§ 371 (c)(1),
(2), (4) Date: May 11, 2012

(51) Int. Cl.
*G06F 12/16* (2006.01)

(52) U.S. Cl.
USPC ............... 711/162; 711/155; 711/E12.021; 711/E12.103

(58) Field of Classification Search
USPC .................. 711/155, 162, E12.021, E12.103
See application file for complete search history.

(56) References Cited

U.S. PATENT DOCUMENTS

| | | |
|---|---|---|
| 2004/0068636 A1 | 4/2004 | Jacobson et al. |
| 2006/0064550 A1 | 3/2006 | Katsuragi et al. |
| 2006/0143412 A1 | 6/2006 | Armangau |

FOREIGN PATENT DOCUMENTS

WO  2008144018 A1  11/2008

*Primary Examiner* — Hal Schnee
(74) *Attorney, Agent, or Firm* — Volpe And Koenig, P.C.

(57) ABSTRACT

In a storage apparatus using AW technology, deterioration in I/O performance accompanying saving of data for creating a snapshot is suppressed as much as possible.

When saving a snapshot image after returning a write completion response to a host computer, a storage apparatus according to the present invention performs the saving preferentially for a storage area with a low priority of snapshot image deletion.

11 Claims, 39 Drawing Sheets

Fig. 5

| PVOL # | Latest generation # | Pair ID | SVOL # | Generation # | Status | Deletion timing |
|---|---|---|---|---|---|---|
| 0 | 3 | 0 | 6 | 1 | Snapshot held | 2012/01/24 13:00 |
| | | 1 | 2 | 3 | Snapshot held | 2012/01/25 13:00 |
| | | 2 | 10 | 2 | Snapshot held | 2012/01/26 13:00 |
| | | 3 | 5 | - | Snapshot unacquired | - |
| | | ... | | | | |
| 1 | 15 | 0 | 3 | 3 | Being restored | 2012/01/24 13:00 |
| | | 1 | 4 | 11 | Snapshot held | - |
| | | 2 | 15 | 8 | Snapshot held | - |
| | | ... | | | | |
| 2 | 0 | | | | | |
| ... | ... | | | | | |

Fig. 6

| PVOL# | Area ID | Save state | Restore state | CAW attribute | Generation # |
|---|---|---|---|---|---|
| 0 | 0 | Saved | - | - | - |
| | 1 | Unsaved | - | ON | 2 |
| | 2 | Unsaved | - | ON | 4 |
| | 3 | Unsaved | - | OFF | - |
| | ... | ... | | ... | ... |
| 1 | 0 | Saved | Done | - | - |
| | 1 | Unsaved | Not done | OFF | - |
| | 2 | Saved | Not done | - | - |
| | 3 | Unsaved | Not done | ON | 4 |
| | ... | ... | | | ... |
| ... | ... | ... | | | ... |

| VOL# | Area ID | Shared page ID | Own page ID |
|---|---|---|---|
| 0 | 0 | 1 | 10 |
|  | 1 | - | - |
|  | 2 | - |  |
|  | 3 | - |  |
|  | ... | ... |  |
| 1 | 0 | 12 | - |
|  | 1 | - |  |
|  | 2 | 0 |  |
|  | 3 | - |  |
|  | ... | ... |  |
| ... | ... | ... |  |

| Chunk ID | Page ID | Status | Address |
|---|---|---|---|
| 0 | 0 | Allocated | Vol1-2 |
| | 1 | Allocated | Vol0-0 |
| | 2 | Unallocated | - |
| | 3 | Unallocated | - |
| | 4 | Unallocated | - |
| 1 | 10 | Allocated | Vol2-1 |
| | 11 | Unallocated | - |
| | 12 | Allocated | Vol1-0 |
| | 13 | Unallocated | - |
| | 14 | Allocated | Vol2-8 |
| 2 | 20 | Allocated | Vol2-2 |
| | 21 | Allocated | Vol2-0 |
| | 22 | Unallocated | - |
| | 23 | Allocated | Vol3-1 |
| | 24 | Unallocated | - |
| 3 | 31 | Formatting | - |
| | 32 | ... | ... |
| | ... | ... | ... |
| ... | ... | ... | ... |

| AP# | Backup agent IP | PVOL# | Schedule | Pair ID |
|---|---|---|---|---|
| AP1 | 192.168.10.10 | 0 | 2012/01/26 13:00 | 0 |
| | | | 2012/01/27 13:00 | 1 |
| | | | 2012/01/28 13:00 | 2 |
| | | | 2012/01/29 13:00 | 3 |
| | | | 2012/01/30 13:00 | 0 |
| | | | 2012/01/31 13:00 | 1 |
| | | | ... | ... |
| AP2 | 192.168.10.11 | 1 | 2012/01/26 13:00 | 0 |
| | | | 2012/01/27 13:00 | 1 |
| | | | 2012/01/28 13:00 | 2 |
| | | | ... | ... |
| ... | ... | ... | ... | ... |

| AP# | Backup agent IP | PVOL# | Snapshot acquisition time | Pair ID |
|---|---|---|---|---|
| AP1 | 192.168.10.10 | 0 | 2012/01/21 13:00 | 0 |
| | | | 2012/01/22 13:00 | 1 |
| | | | 2012/01/23 13:00 | 2 |
| | | | 2012/01/24 13:00 | 3 |
| AP2 | 192.168.10.11 | 1 | 2012/01/22 13:00 | 0 |
| | | | 2012/01/23 13:00 | 1 |
| | | | 2012/01/24 13:00 | 2 |
| | | | ... | ... |
| ... | ... | ... | ... | ... |

Fig. 40

| PVOL # | Latest generation # | Pair ID | SVOL # | Generation # | Status | Temporary |
|---|---|---|---|---|---|---|
| 0 | 3 | 0 | 6 | 1 | Snapshot held | Yes |
| | | 1 | 2 | 3 | Snapshot held | - |
| | | 2 | 10 | 2 | Snapshot held | - |
| | | 3 | 5 | - | Snapshot unacquired | - |
| | | ... | | | | |
| 1 | 15 | 0 | 3 | 3 | Being restored | - |
| | | 1 | 4 | 11 | Snapshot held | - |
| | | 2 | 15 | 8 | Snapshot held | - |
| | | ... | | | | |
| 2 | 0 | | | | | |
| ... | ... | | | | | |

SELECTING A SNAPSHOT METHOD BASED ON CACHE MEMORY CONSUMPTION

TECHNICAL FIELD

The present invention relates to a storage apparatus storing data accessed by a host computer.

BACKGROUND ART

As a technique for backing up data of a volume managed by a storage system, there has been conventionally known a method of managing a snapshot of a state of the volume at a predetermined time point.

In the case of managing a snapshot, when a write access to a save source volume (primary volume) occurs, data in a write-destination area of the primary volume is saved into a save-destination volume (secondary volume). After that, write-target data is copied to the primary volume, and a response is returned to a write-access source. Therefore, there is a problem that it takes a long time to return the response to the write-access source after the occurrence of the write access, and write response is bad.

In comparison, there is known a copy-after-write (CAW) technique in which write response is speeded up by, when a write access occurs, writing write data into a cache memory, returning a response, saving data of a primary volume into a secondary volume in asynchronization with the write access, and writing the write data of the cache memory into the primary volume (for example, see Patent Literature 1).

CITATION LIST

Patent Literature

PTL 1: Patent Literature 1: Specification of U.S. Patent Application Publication No. 2006/0143412

SUMMARY OF INVENTION

Technical Problem

In the CAW technique described in Patent Literature 1, write data is temporarily stored in a cache memory, and, in asynchronization with this, data on a primary volume is saved into a secondary volume as a snapshot. Therefore, there is a possibility that, when a lot of write accesses occur, the amount of cache used increases and other processes may be influenced. Therefore, it is necessary to temporarily stop CAW when the amount of cache used reaches a predetermined threshold and switch to an operation of saving the data of the primary volume into the secondary volume in synchronization with a write access (Copy-On-Write: COW). This may cause temporary decrease in I/O performance.

The present invention has been made in view of the above problem, and its object is to suppress deterioration in I/O performance accompanying data saving for creating a snapshot as much as possible in a storage apparatus using the CAW technique.

Solution to Problem

When saving a snapshot image after returning a write completion response to a host computer, a storage apparatus according to the present invention performs the saving preferentially for a storage area with a low priority of snapshot image deletion.

Advantageous Effects of Invention

According to a storage apparatus according to the present invention, a snapshot image of a storage area having a high priority in snapshot image deletion is deleted in the near future even if saving is not performed, and it becomes unnecessary to perform saving for the storage area. That is, for the storage area, it becomes unnecessary to save data before writing as a snapshot image after that. Therefore, the time during which write data stays on a cache memory can be shortened by the time required for saving. As a result, the amount of the cache memory used can be reduced, and deterioration in I/O performance accompanying switching to the COW operation can be suppressed.

BRIEF DESCRIPTION OF DRAWINGS

FIG. 5 is a diagram illustrating the configuration of a pair information management table 1171.

FIG. 6 is a diagram illustrating the configuration of a difference area management table 1172.

FIG. 7 is a diagram illustrating the configuration of an address management table 1181.

FIG. 9 is a diagram illustrating the configuration of a page management table 1182.

FIG. 10 is a diagram showing the configuration of a backup schedule 321.

FIG. 11 is a diagram showing the configuration of a backup catalog 322.

FIG. 40 is a diagram illustrating the configuration of a pair information management table 1171 in the third embodiment.

DESCRIPTION OF EMBODIMENTS

Embodiments of the present invention will be described with reference to drawings.

The embodiments described below do not limit the present invention according to the claims, and all of various components and combinations thereof described in the embodiments are not necessarily required for solution means of the present invention.

Though various information may be described with the use of an expression of "xxx table" in the description below, the various information may be expressed in a data structure other than a table. An "xxx table" can be called "xxx information" in order to indicate that the information does not depend on a data structure.

Though numbers are adopted to indicate the kinds of identification information about various objects (for example, volumes, chunks, pages and the like) in the description below, other kinds of identification information may be adopted.

In the description below, at least a part of processes performed by a controller to be described later is performed by a processor (for example, a CPU: Central Processing Unit) executing a computer program. The processor may be the CPU itself or may include a hardware circuit which performs a part or all of the processes performed by the processor.

First Embodiment

System Configuration

Figure 1:
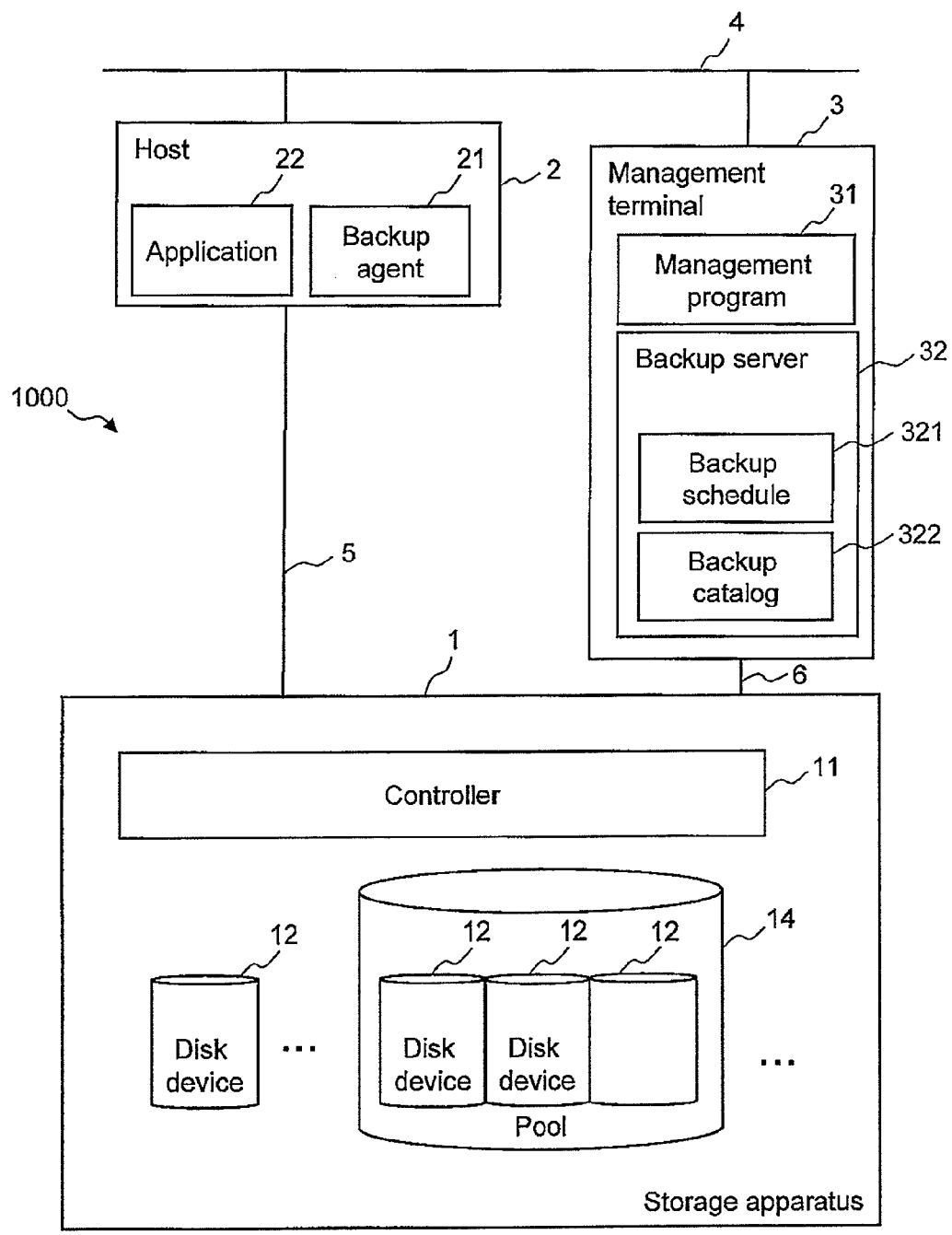
FIG. 1 is a whole configuration diagram of a computer system 1000 according to a first embodiment.

FIG. 1 is a whole configuration diagram of a computer system 1000 according to a first embodiment of the present invention. The computer system 1000 has a storage apparatus 1, a host computer (which may be hereinafter referred to as simply a "host") 2 and a management terminal 3. The number of storage apparatuses 1, hosts 2 and management terminals 3 can be one or more. The storage apparatus 1 and the host 2 are mutually connected via a communication network (for example, a SAN: Storage Area Network) 5. The storage apparatus 1 and the management terminal 3 are mutually connected via a communication network (for example, a LAN: Local Area Network) 6.

The storage apparatus 1 is a device storing data accessed by the host 2, and it is a storage apparatus performing the CAW operation and COW operation described above. The storage apparatus 1 has a controller 11 and multiple disk devices 12. The controller 11 is connected to each of the disk devices 12 via an internal bus not shown. The disk devices 12 form a storage area (hereinafter referred to as a pool) 14.

The disk device 12 is a drive for a disk-type storage medium and stores data write-requested by the host 2. In addition to or instead of the disk device 12, the storage apparatus 1 may be provided with a storage device having another kind of storage medium (for example, a flash memory drive).

The host 2 is a computer which reads out data stored in the storage apparatus 1 or writes data into the storage apparatus 1, and it is provided with a backup agent 21 and an application 22. The backup agent 21 is a program which backs up the data stored in the storage apparatus 1 onto the management terminal 3 to be described later. The application 22 is a program which performs various processes using the data stored in the storage apparatus 1.

The management terminal 3 performs various processes by a CPU not shown executing a management program 31. The management terminal 3 has a display device and can display a screen for managing the storage apparatus 1 on the display device. The management terminal 3 receives a management operation request from a user (for example, an operator of the management terminal 3) and transmits the management operation request to the storage apparatus 1.

The management terminal 3 is provided with a backup server 32. The backup server 32 is a program which backs up the data stored in the storage apparatus 1 into a backup medium not shown, operating in cooperation with the backup agent 21. The backup server 32 is provided with a backup schedule 321 and a backup catalog 322. These will be described later.

Figure 2:
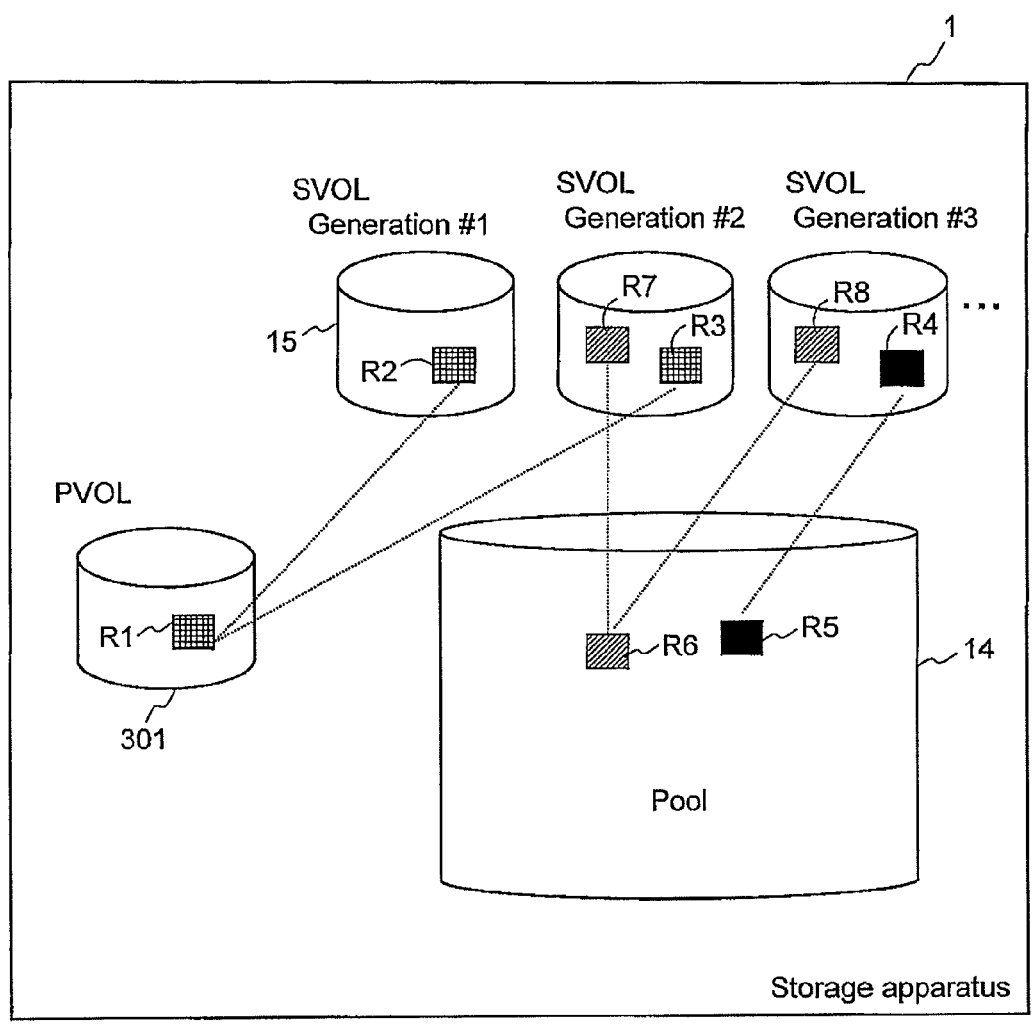
FIG. 2 is a diagram illustrating relationships between a primary volume and secondary volumes.

FIG. 2 is a diagram illustrating relationships between a primary volume and secondary volumes. A relationship between these volumes and snapshots will be described below in accordance with FIG. 2.

A primary volume (PVOL) 301 is a volume for writing data to be accessed by the host 2. The PVOL 301 may be a substantive logical volume which forms a RAID (Redundant Array of Independent (or Inexpensive) Disks) group constituted by multiple disk devices 12 (a group of disk devices which stores data at a predetermined RAID level) or may be a virtual logical volume which does not form the RAID group (for example, a volume in thin provisioning or a volume to which a storage resource of an external storage apparatus (for example, a logical volume) has been mapped).

Each secondary volume (SVOL) 15 is a volume which stores a snapshot image at each time point (generation) of the PVOL 301. In this first embodiment, a generation number (generation #) of the SVOL 15 indicates a time point of acquiring the snapshot. The SVOLs 15 are given generation #1, generation #2, generation #3 . . . from the oldest to the newest (that is, an older generation is given a smaller generation number). The SVOLs 15 are virtual logical volumes, and data stored in the SVOLs 15 is actually stored in the PVOL 301 or the pool 14. FIG. 2 shows an example of the data arrangement. This will be described below.

In the data arrangement example shown in FIG. 2, an area R2 in the SVOL 15 of generation #1 and an area R3 in the SVOL 15 of generation #2 are set so as to refer to an area R1 in the PVOL. An area R4 in the SVOL 15 of generation #3 stores data saved from an area in the PVOL 301 updated between the generation #2 and the generation #3, and it is set so as to refer to an area R5 in the pool 14. As for an area R7 in the SVOL 15 of generation #2 and an area R8 in the SVOL 15 of generation #3 corresponding to areas in the PVOL 301, which were updated between the generation #1 and the generation #2 and were not updated between the generation #2 and the generation #3, they are set so as to refer to an area R6 in the pool 14, which stores data saved from an area in the PVOL 301 which was updated between the generation #1 and the generation #2.

The PVOL 301 corresponds to a "first storage unit" in the first embodiment, and the SVOL or a storage area which stores its substance corresponds to a "second storage unit". The first and second storage units are not necessarily required to be configured as separate storage apparatuses. It is sufficient if the controller 11 can recognize them at least as separate storage areas.

Figure 3:
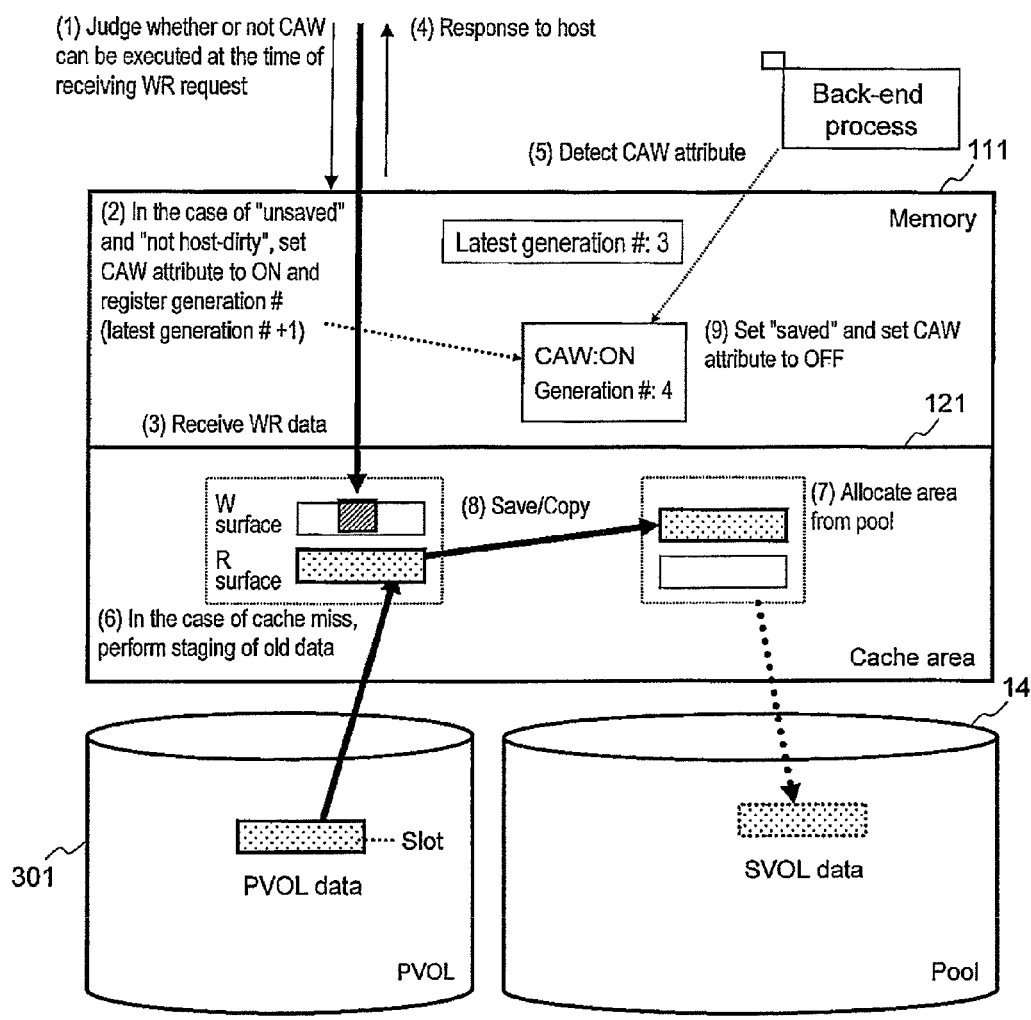
FIG. 3 is a diagram illustrating the outline of data processing in a storage apparatus 1.

FIG. 3 is a diagram illustrating the outline of data processing in the storage apparatus 1. A procedure for processing a write request to the storage apparatus 1 will be described below in accordance with FIG. 3. For convenience of description, a memory 111 and a cache area 121 to be described with reference to FIG. 4 described later are used in FIG. 3.

(FIG. 3—Step 1)

When receiving a write (WR) request (a write request) specifying the PVOL 301 from the host 2, the controller 11 judges whether or not CAW can be executed, in accordance with step 2 below.

(FIG. 3—Step 2)

If data before writing has not been saved from a writing-destination area (slot) in the PVOL 301, and a cache sub-area secured in the cache area 121 to be described later (which may be hereinafter referred to as a "secured area") is not host-dirty (the data stored in the PVOL 301 and data stored in this cache sub-area are not synchronized, and the data has not been reflected on the PVOL 301 yet), then the controller 11 sets the CAW attribute of the writing-destination area in the PVOL 301 to ON and registers the latest generation number (the latest generation #) plus 1 (that is, a value obtained by adding 1 to the latest generation number) as a generation #.

(FIG. 3—Step 2: Supplementation)

"the CAW attribute is ON" means that CAW should be executed, and that the CAW attribute is OFF means that CAW is not executed. A slot is an area with a predetermined capacity unit, which is a management unit in the cache area 121. A slot size may be, for example, larger than the size of write data at the time of the host 2 requesting write. In the first embodiment, the PVOL 301 is divided in areas with the same size as the slot and managed, and each of the divided areas of the PVOL 301 is also referred to as a slot.

(FIG. 3—Step 3 to step 4)

The controller 11 receives write-target data (WR data: write data) accompanying the write request, from the host 2, and writes the write data onto a write surface (W surface) (an area for storing data to be written into a volume) in the secured area in the cache area 121 (step 3). Next, the controller 11 transmits a response to the write request, to the host 2 (step 4).

(FIG. 3—Step 5)

The controller 11 detects the CAW attribute of a write-destination area in the PVOL 301 in asynchronization with the above steps 1 to 4 (in back end).

(FIG. 3—Step 6)

If the CAW attribute is ON, the controller 11 judges whether or not, on a read surface (R surface) (an area for storing data read out from a volume) of the secured area, data before updating in a writing-destination area (an area (slot) in the PVOL 301) of the data stored on the W surface of the secured area is cached. If data before updating is not cached, the controller 11 reads out the data before updating from the write-destination area in the PVOL 301 onto the R surface in the secured area (staging of old data).

(FIG. 3—Steps 7 and 8)

The controller 11 allocates an area (page) from the pool 14 to an area in an SVOL 15 corresponding to the write-destination area (the area in the PVOL 301) (step 7), and saves the data read out to the R surface, into the page as a snapshot of the write-destination area (step 8). A page is a unit area allocated in the pool 14. The size of a page may be, for example, the same as a slot.

(FIG. 3—Step 9)

When completing the process for saving the data before updating to the SVOL, the controller 11 sets a flag indicating that the data has been saved and returns the CAW attribute to OFF.

Figure 4:
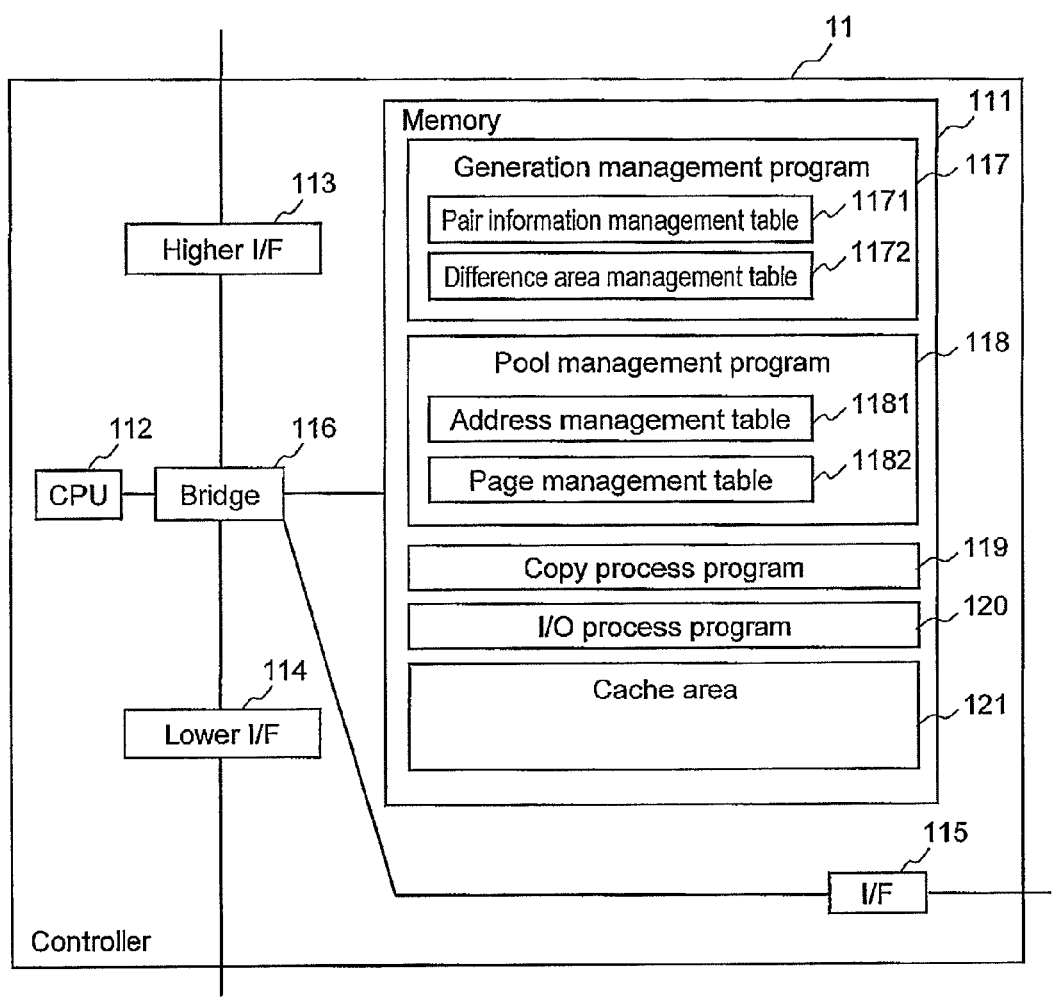
FIG. 4 is a block diagram of a controller 11.

FIG. 4 is a block diagram of the controller 11. The controller 11 is provided with the memory 111, a CPU 112, a higher interface (higher I/F) 113, a lower interface (lower I/F) 114, an interface (I/F) 115 and a bridge 116.

The memory 111 stores data and programs required for control. Specifically, the memory 111 stores a generation management program 117, a pool management program 118, a copy process program 119 and an I/O process program 120.

The generation management program 117 manages a pair information management table 1171 and a difference area management table 1172 and executes a snapshot management process. The pool management program 118 manages an address management table 1181 and a page management table 1182, and executes a process for managing a pool 14. The copy process program 119 executes a data copying process. The I/O process program 120 calls another program appropriately and executes a data input/output process.

The memory 111 has the cache area 121 configured by a cache memory. The cache area 121 is configured, for example, by a nonvolatile memory, such as an SRAM and an EEPROM (Electrically Erasable Programmable Read Only Memory), or a battery backed-up DRAM or like, and it stores data without causing the data to volatilize even if the storage apparatus 1 is in a shutdown state.

The CPU 112 controls each of the units to execute the various processes by executing the programs stored in the memory 111. The higher I/F 113 mediates communication with the host 2. The higher I/F 113 may be, for example, Fibre Channel (FC), iSCSI or the like. The lower I/F 114 mediates communication with the disk device 12. The lower I/F 114 is, for example, a disk I/F such as an FC, SAS and SATA. The I/F 115 mediates communication with the management terminal 3. The bridge 116 communicably connects the memory 111, the CPU 112, the higher I/F 113, the lower I/F 114 and the I/F 115.

FIG. 5 is a diagram illustrating the configuration of the pair information management table 1171. In the description below, a logical volume is described as "VOL" appropriately.

The pair information management table 1171 manages a record in which a PVOL number (PVOL #), a latest generation number (latest generation #), a pair ID, an SVOL number (SVOL #), a generation number (generation #), a status and a deletion timing are associated with one another.

The PVOL # is a number which uniquely identifies a PVOL to be a snapshot copy source in the storage apparatus 1. The latest generation # is a generation number of the latest snapshot of the relevant PVOL. The pair ID is a number which uniquely identifies a pair of a PVOL and an SVOL (a copy pair). The SVOL # is a number which uniquely identifies a volume (SVOL) to be a snapshot copy destination in the storage apparatus 1. The generation # is a generation number of a snapshot stored in the relevant SVOL. The status is a state of a copy pair specified by a pair ID. The status is "snapshot held" indicating a state in which a snapshot is held, "snapshot un-acquired" indicating a state in which a snapshot has not been acquired or "being restored" indicating a state in which restore from the relevant SVOL is being executed. Restore means to reflect snapshot data saved in an SVOL on a PVOL.

As the deletion timing, a date and time when a snapshot held by an SVOL corresponding to a pair ID is deleted is held. Specifically, the deletion timing is a date and time when, by the backup agent 21 performing backup for a PVOL corresponding to the pair ID and creating the latest snapshot, the snapshot generation number is increased by one, and the old-generation snapshot becomes unnecessary and is deleted. Since the process for deleting the old-generation snapshot is performed together with the backup process, the deletion timing is notified to the storage apparatus 1 from the backup agent 21 or the backup server 32. The details will be described with reference to FIG. 12 to be described later.

The first record in FIG. 5 indicates that: the VOL of PVOL #0 is a PVOL; the latest generation number is 3; a copy pair is made between the PVOL and an SVOL of VOL #6; the pair ID of the copy pair is 0; the generation number of the SVOL is 1; and the SVOL holds a snapshot but the snapshot is to be deleted.

FIG. 6 is a diagram illustrating the configuration of the difference area management table 1172. The difference area management table 1172 manages a record in which a PVOL number (PVOL #), an area ID, a save state, a restore state, a CAW attribute and a generation number (generation #) are associated with one another.

The PVOL # is a number which uniquely identifies a PVOL to be a snapshot copy source in the storage apparatus 1. The area ID is an example of area identification information, and it is a number which identifies an area (slot) divided in the PVOL. The save state is information indicating whether or not data to be written into the area in the PVOL has been saved in the pool 14. The save state is, for example, "saved" indicating that data has been saved or "unsaved" indicating that data has not been saved. As the restore state, "done" indicating that restore has been done is set when restore has been executed, and "not done" is set when restore has not been executed. As for the CAW attribute, "ON" is set when it is necessary to execute CAW for the area, that is, when it is necessary to save data from the relevant PVOL area as a snapshot, and "OFF" is set when it is not necessary to execute CAW, that is, when it is not necessary to save data from the PVOL area, as a snapshot. The generation # is a generation number of a snapshot corresponding to data to be written into the relevant area (data in the cache area 121). In the first embodiment, as the generation # of data written after the time point of acquiring the latest snapshot, the latest generation # of the snapshot at the time of the writing plus 1 is set. The generation # is an example of time relationship information indicating a temporal relationship with a time point of acquiring a snapshot for a PVOL. Instead of the generation #, the snapshot acquisition date and time itself may be managed. That is, it is sufficient if the time point of acquiring each snapshot can be identified.

The second record in FIG. 6 indicates that: in an area the area number # of which is 1 in a PVOL of PVOL #0, data has not been saved; restore has not been executed; CAW should be executed when data is written into the area; and the generation # of a snapshot of the area is 2.

FIG. 7 is a diagram illustrating the configuration of the address management table 1181. The address management table 1181 manages a record in which a VOL number (VOL #), an area ID, a shared page ID and an own page ID are associated with one another.

The VOL # is a number which uniquely identifies an SVOL in the storage apparatus 1. The area ID is a number which identifies an area divided in the SVOL. The shared page ID is a number which identifies a shared page in which the data of the area is stored. A shared page is a page which may be possibly referred to by other SVOLs. The own page ID is a number which identifies an own page in which the data of the area is stored. An own page is a page referred to only by the relevant SVOL. Specifically, it is a page which manages a snapshot writable into the relevant SVOL and stores data when writing into the SVOL is performed.

The first record in FIG. 7 indicates that, for an area of area #0 in an SVOL of VOL #0, the shared page ID is 1, and the own page ID is 10.

Figure 8:
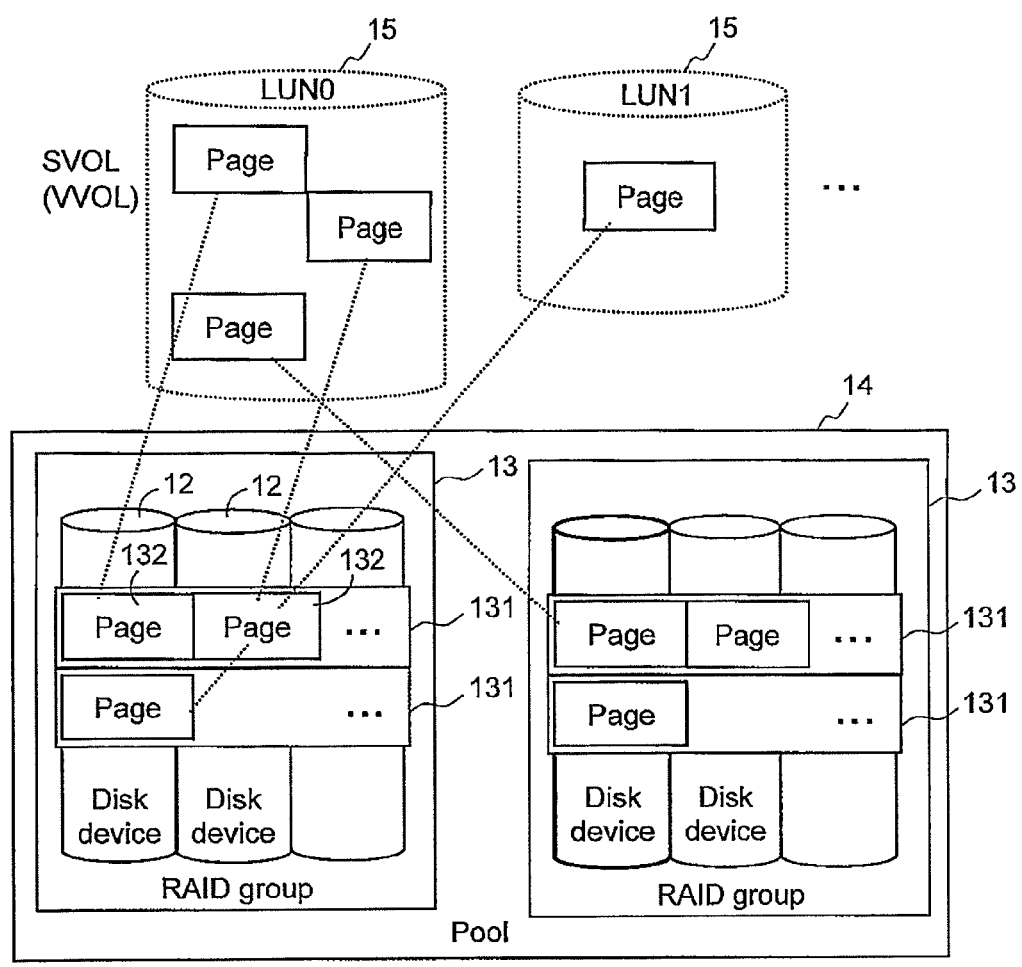
FIG. 8 is a diagram illustrating relationships between a pool 14 and SVOLs.

FIG. 8 is a diagram illustrating a relationship between the pool 14 and SVOLs. The pool 14 is constituted by multiple chunks 131, and each chunk 131 is constituted by multiple pages 132. As for the SVOL (virtual volume: VVOL) 15, a page 132 in the pool 14 is allocated to an area where data is actually to be stored.

FIG. 9 is a diagram illustrating the configuration of the page management table 1182. The page management table 1182 manages a record in which a chunk ID, a page ID, a status and an address are associated with one another.

The chunk ID is a number which uniquely identifies a chunk 131 including a page 132, in the pool 14. The page ID is a number which uniquely identifies the page 132 in the pool 14. The status is a state of the page 132. The status of the page 132 is, for example, "allocated" or "unallocated". The address is the address of a volume to which relevant page is allocated.

The first record in FIG. 9 indicates that a page 132 of page ID 0 in a chunk 131 of chunk ID 0 is allocated as an area with an address 2 of a volume of Vol 1.

FIG. 10 is a diagram showing the configuration of the backup schedule 321. The backup schedule 321 is a table in which a schedule for the backup agent 21 to perform backup is described, and it manages a record in which an application number (AP #), a backup agent IP, a PVOL number (PVOL #), a schedule and a pair ID are associated with one another.

The AP # is a number which uniquely identifies a backup agent 21. The backup agent IP is an address (here, an IP (Internet Protocol) address) of a computer which executes the backup agent 21. The PVOL # is an identification number of a PVOL 301 targeted by backup, and it corresponds to the PVOL # in each table. The schedule indicates a date and time when the backup agent 21 performs backup. The pair ID corresponds to the pair ID held by the pair information management table 1171.

When the backup agent 21 performs backup, data before updating which is stored in the PVOL is saved into an SVOL as a snapshot image. As for an area in a PVOL the snapshot image of which has already been created, the snapshot generation number is increased by one.

FIG. 11 is a diagram showing the configuration of the backup catalog 322. The backup catalog 322 is a table which holds the history of backup performed by the backup agent 21. The configuration of the backup catalog 322 is similar to that of the backup schedule 321 except that the schedule of the backup schedule 321 is replaced with snapshot acquisition time.

Backup Process

Figure 12:
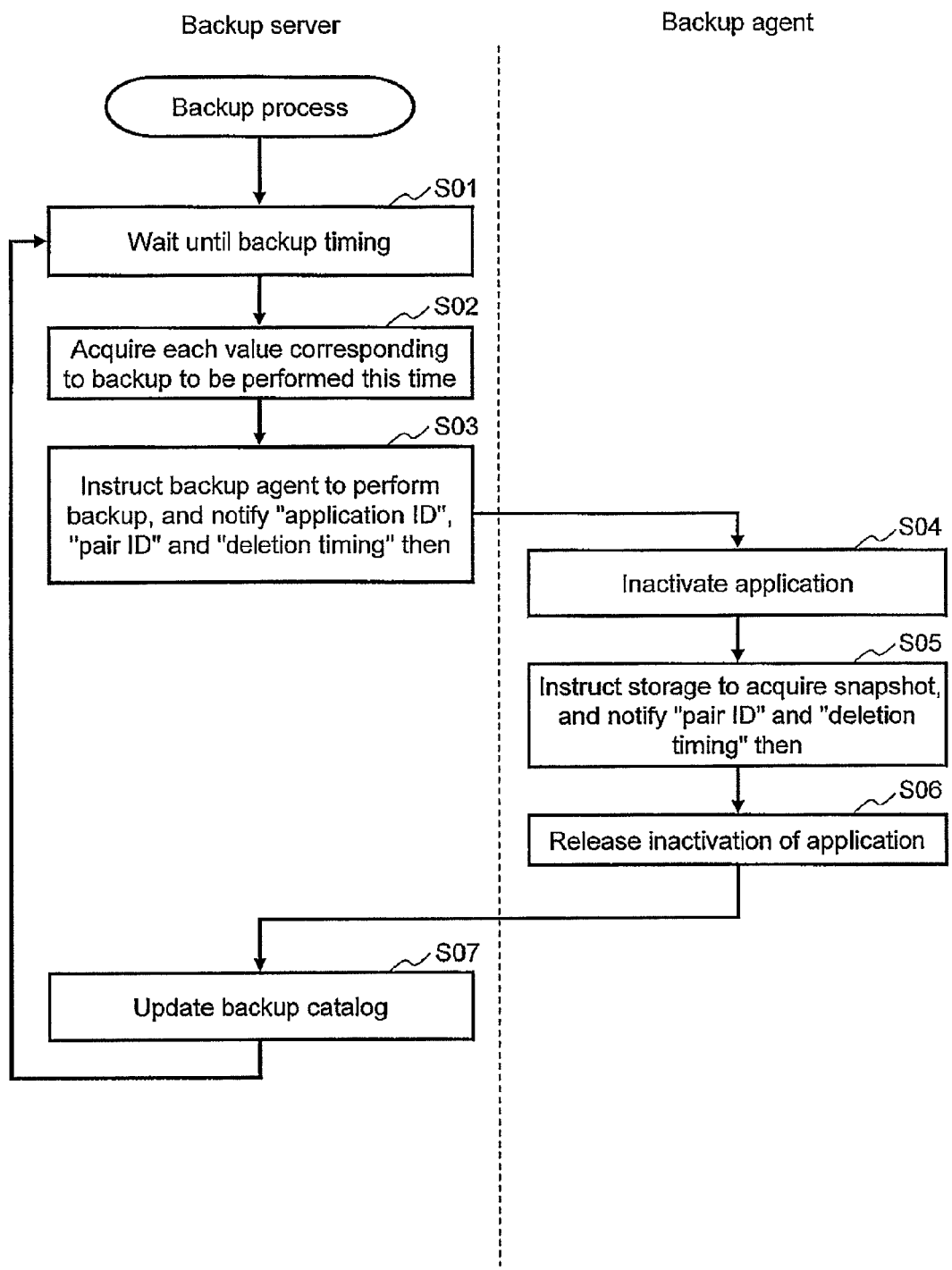
FIG. 12 is a flowchart illustrating a procedure for a backup agent 21 to back up data stored in the storage apparatus 1.

FIG. 12 is a flowchart illustrating a procedure for the backup agent 21 to back up data stored in the storage apparatus 1. Each step in FIG. 12 will be described below.

The backup server 32 waits until a date and time when backup should be performed comes, in accordance with the description in the backup schedule 321 (S01). The backup server 32 acquires the value of each field corresponding to the backup to be performed this time from among records held by the backup schedule 321 (S02). The backup server 32 instructs the host to perform backup. At this time, an application ID, a pair ID and a deletion timing (=schedule) are also notified (S03).

Receiving the backup instruction of step S03, the host 2 activates the backup agent 21. The backup agent 21 once terminates execution of the application 22 being executed by the host 2 (S04). The backup agent 21 instructs the storage apparatus 1 to create a snapshot (that is, to perform backup). At this time, a pair ID targeted by the backup and deletion timing are also notified (S05). The controller 11 reflects the deletion timing notified then on the relevant record in the pair information management table 1171. When receiving a backup completion notification from the storage apparatus 1, the backup agent 21 resumes execution of the application 22 terminated at step S04 (S06).

When receiving the backup completion notification from the backup agent 21, the backup server 32 records the history thereof into the backup catalog 322 (S07).

Write Process by Storage Apparatus 1

Figure 13:
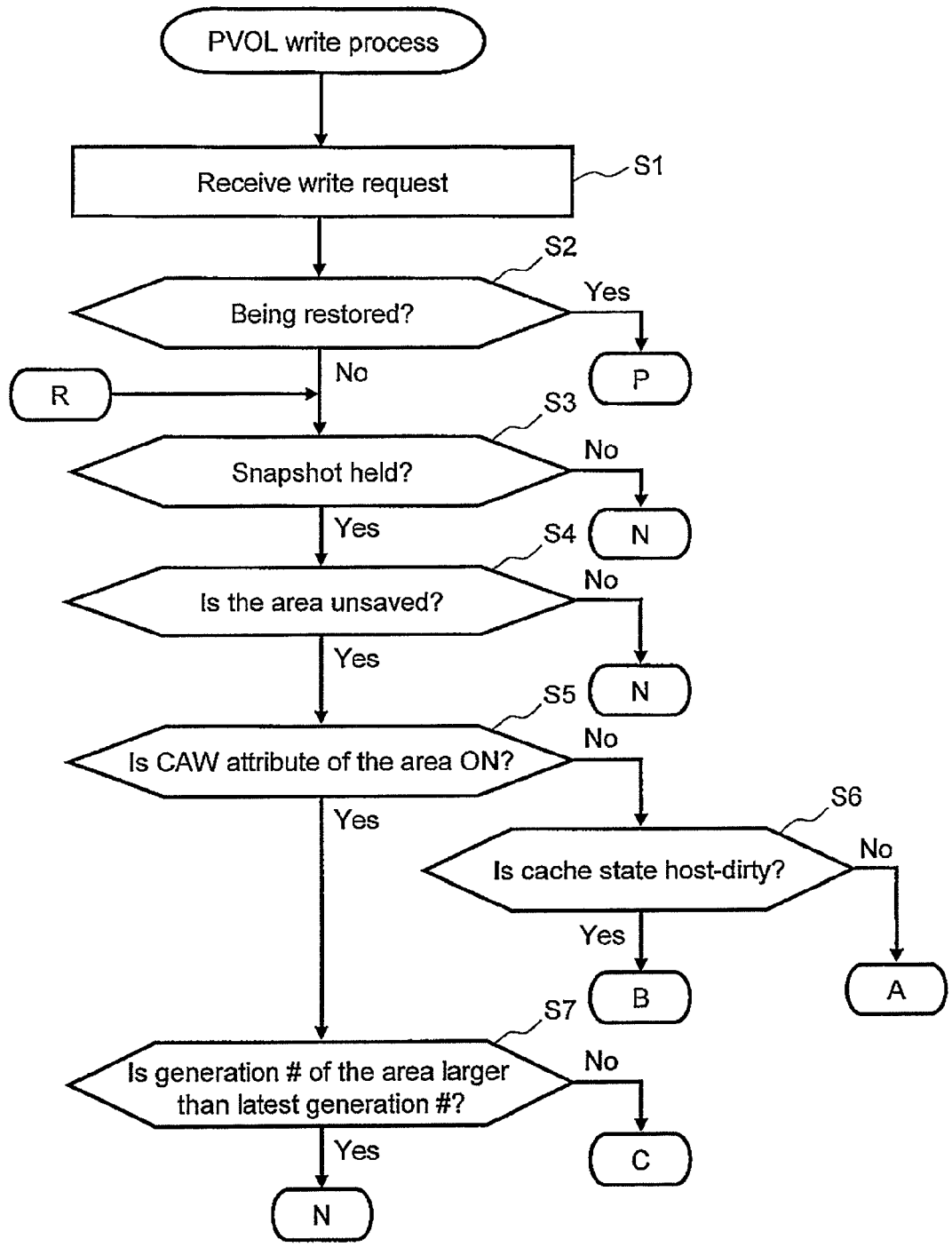
FIG. 13 is a flowchart illustrating a write process for the storage apparatus 1 to write data into a PVOL.

FIG. 13 is a flowchart illustrating a write process for the storage apparatus 1 to write data into a PVOL. Each step in FIG. 13 will be described below.

When receiving a write request from the host 2 (step S1), the controller 11 of the storage apparatus 1 judges whether or not a writing-destination PVOL is being restored (step S2) by referring to the status of a writing-destination PVOL # in the pair information management table 1171. The write request includes, for example, a LUN (logical unit number) indicating the PVOL into which write data is to be written, and an LBA (logical block address) belonging to a writing-destination area in the PVOL. The VOL# of the PVOL and the area ID of the writing-destination area can be identified by these LUN and LBA.

Figure 18:
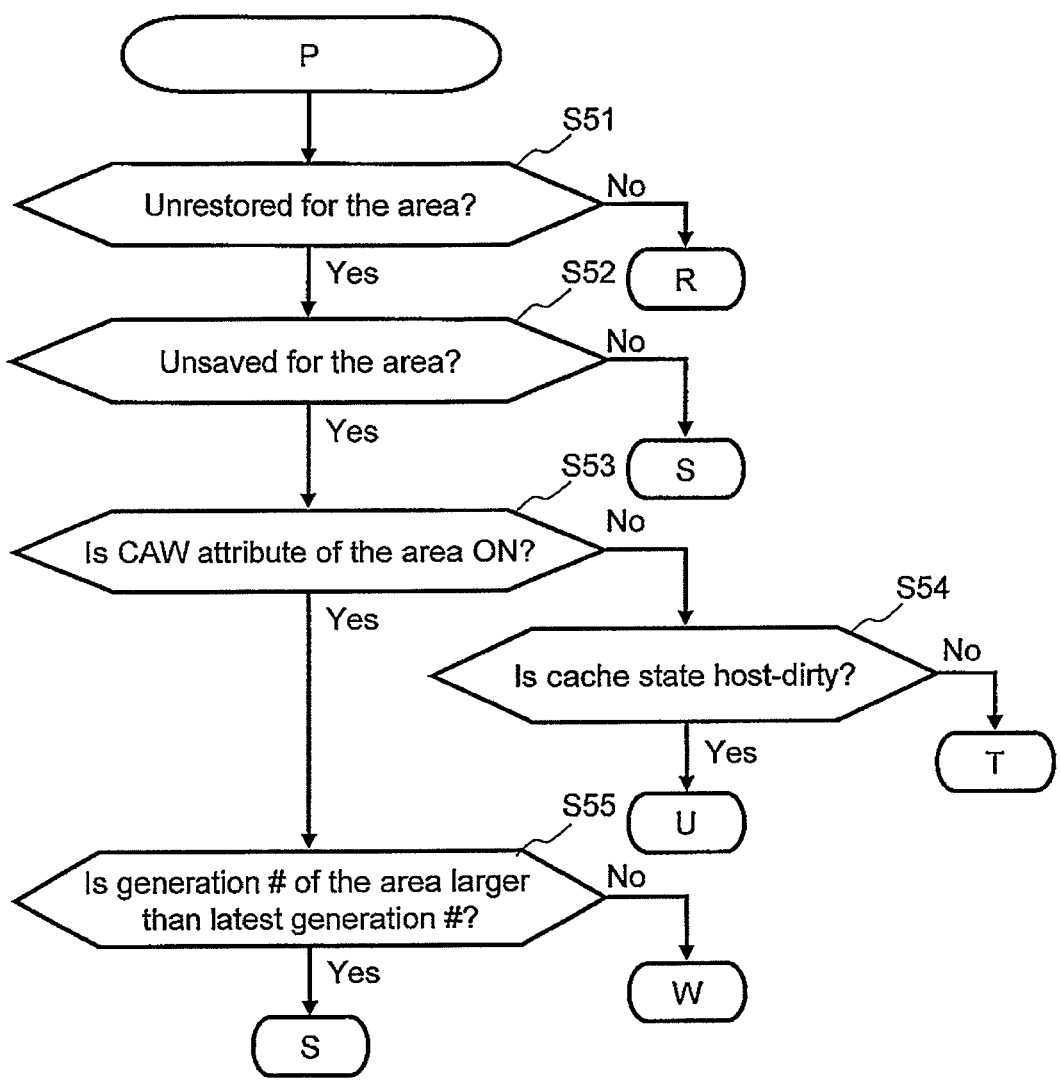
FIG. 18 is a flowchart illustrating a process of a point P.

If the writing-destination PVOL is being restored as a result of the judgment at step S2 (step S2: Yes), the controller 11 advances the process to a point P (FIG. 18). If the writing-destination PVOL is not being restored (step S2: No) or the process proceeds from a point R (FIG. 18), the controller 11 judges whether or not the status of a slot which includes the writing-destination area is "snapshot held" on the basis of the difference area management table 1172 (step S3).

Figure 15:
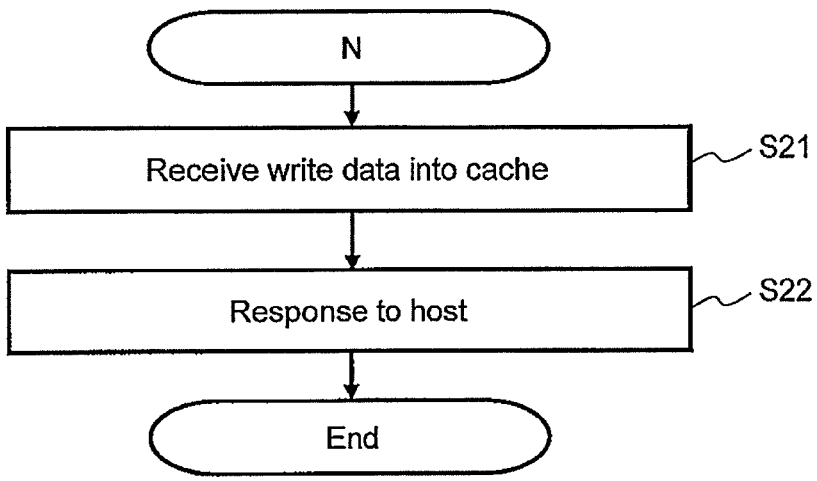
FIG. 15 is a flowchart illustrating a process of a point N.

If the status is not "snapshot held" as a result of the judgment at step 3 (step S3: No), the controller 11 advances the process to a point N (FIG. 15). If the status is "snapshot held" (step S3: Yes), the controller 11 refers to the difference area management table 1172 and judges whether or not the slot is unsaved (step S4).

If the slot is not unsaved as a result of the judgment at step 4 (step S4: No), the controller 11 advances the process to the point N (FIG. 15). If the slot is unsaved (step S4: Yes), the controller 11 refers to the difference area management table 1172 and judges whether or not the CAW attribute of the slot is ON (step S5).

Figure 16:
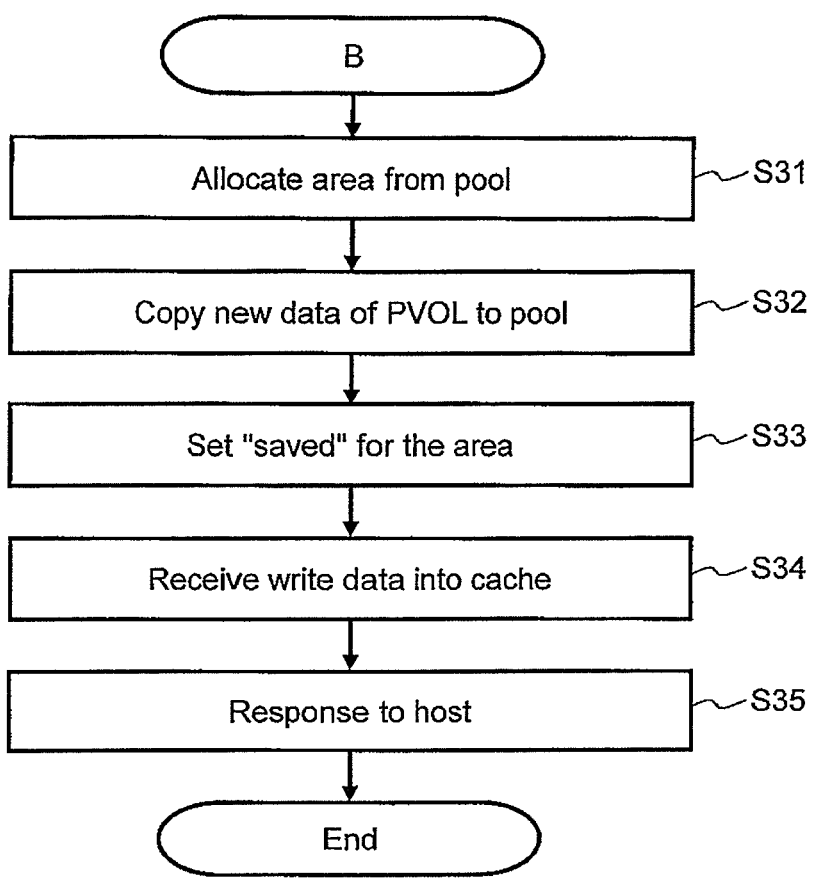
FIG. 16 is a flowchart illustrating a process of a point B continued from step 6 in FIG. 13.

If the CAW attribute is not ON as a result of the judgment at step 5 (step S5: No), the controller 11 judges whether or not the cache state of the cache area 121 is host-dirty, that is, whether or not there is data on the W surface of the cache area 121 corresponding to the slot (step S6). If the cache state is not host-dirty (step S6: No), the controller 11 advances the process to a point A (FIG. 14), and, if the state is host-dirty (step S6: Yes), advances the process to a point B (FIG. 16).

If the CAW attribute is ON as a result of the judgment at step S5 (step S5: Yes), the controller 11 judges whether or not the generation # of the area is larger than the latest generation # (step S7).

Figure 17:
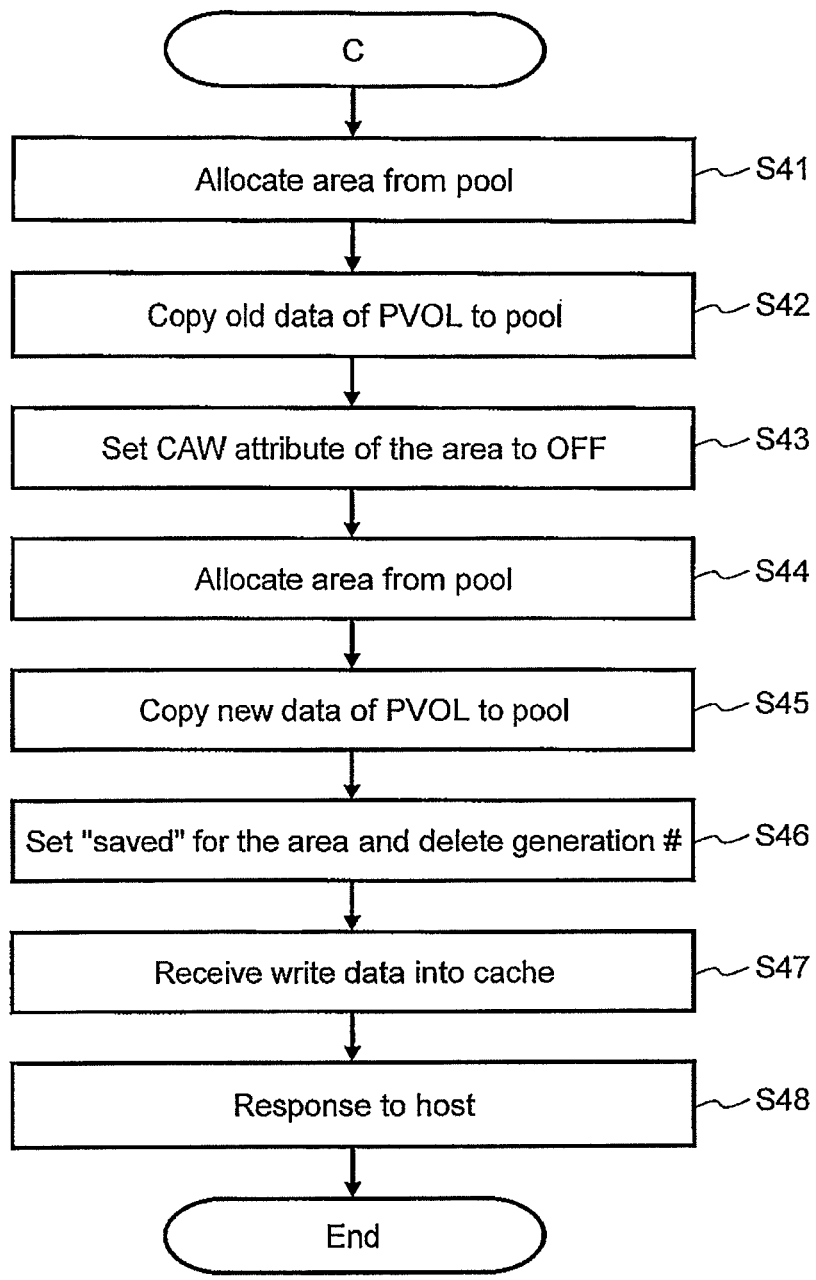
FIG. 17 is a flowchart illustrating a process of a point C.

If the generation # of the area is larger than the latest generation # as a result of the judgment at step 7 (step S7: Yes), it means that the data in the cache area 121 to be written into the area is data updated after the time point of acquiring the latest snapshot and is not data constituting the snapshot (a snapshot component). Therefore, the controller 11 advances the process to the point N (FIG. 15). If the generation # of the area is equal to or smaller than the latest generation # (step S7: No), it indicates that the next snapshot was acquired after the time point when the data in the cache area 121 to be written into the area was written, and means that the data in the cache area 121 is a snapshot component. Therefore, the controller 11 advances the process to a point C (FIG. 17).

Figure 14:
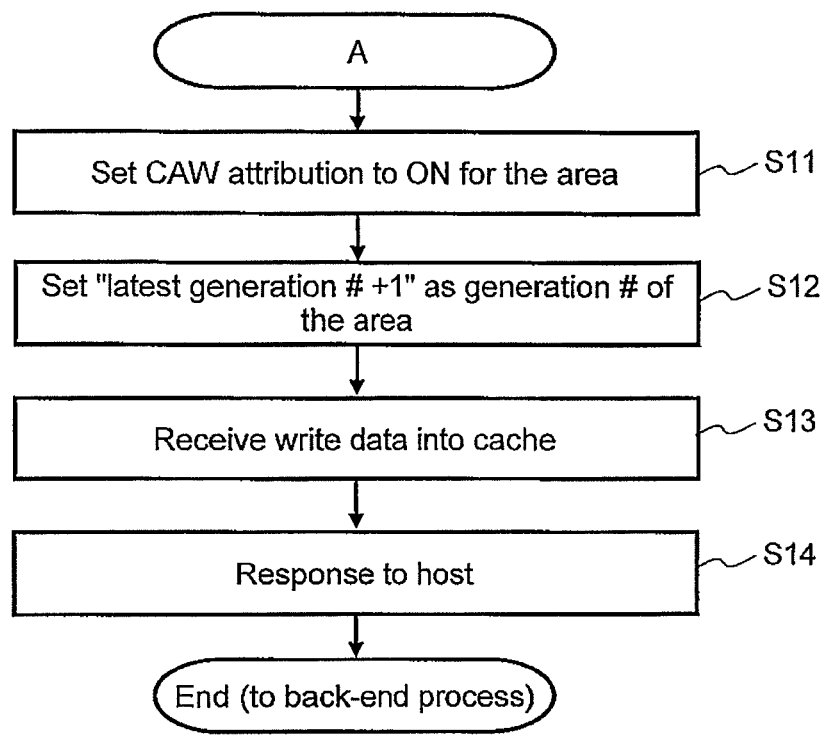
FIG. 14 is a flowchart illustrating a process of a point A.

FIG. 14 is a flowchart illustrating the process of the point A. Each step in FIG. 14 will be described below.

The controller 11 sets a CAW attribute corresponding to the writing-destination area in the difference area management table 1172 to ON (step S11) and sets a value obtained by adding 1 to the latest generation # of the relevant PVOL in the pair information management table 1171 as the generation # of the area (step S12). Thereby, it can be grasped that data in the cache area 121 to be stored into the area is data updated after the time of acquiring the latest snapshot.

The controller 11 stores the write data to be written into the area, into the cache area 121 of the memory 111 (step S13) and transmits a response to the write request, to the host 2 (step S14).

In the flowchart in FIG. 14, the response is returned to the host 2 at the time of receiving the write data into the cache area 121, and a process for actually writing the write data into the PVOL 301 is performed asynchronously in back end.

FIG. 15 is a flowchart illustrating a process of the point N. Each step in FIG. 15 will be described below.

The controller 11 stores the write data into the cache area 121 of the memory 111 (step S21) and transmits a response to the write request, to the host 2 (step S22). Thereby, the data in the cache area 121 is updated with the new write data.

FIG. 16 is a flowchart illustrating a process of the point B continued from step 6 in FIG. 13. Each step in FIG. 16 will be described below.

The controller 11 identifies a generation # associated with the writing-destination area in the PVOL, on the basis of the difference area management table 1172, identifies an SVOL of the generation # on the basis of the pair information management table 1171, allocates an area to the SVOL corresponding to the writing-destination area, from the pool 14, and updates the page management table 1182 in accordance with the allocation (step S31). That is, the status of the allocated page is set to "allocated", and the address of the relevant area of the SVOL is set as the address.

The controller 11 copies the write data stored in the cache area 121 to the area (page) allocated at step S31 (step S32). If the data stored in the cache area 121 is only a part of the data of a slot, the data of the relevant slot in the PVOL is read out onto the R surface of the cache area 121 to make up for a non-existing part of the data of the slot with the data read out onto the R surface, and then the data after the supplementation is copied to the page allocated at step S31.

The controller 11 sets "saved" as a save state corresponding to the area in the difference area management table 1172 (step S33), stores the write data into the cache area 121 of the memory 111 (step S34) and transmits a response to the write request (step S35) to the host 2.

FIG. 17 is a flowchart illustrating a process of the point C. Each step in FIG. 17 will be described below.

The controller 11 identifies a generation # associated with the writing-destination area in the PVOL on the basis of the difference area management table 1172, identifies an SVOL of an immediately previous generation, that is, an SVOL of the generation # minus 1 on the basis of the pair information management table 1171, and allocates a page to an SVOL corresponding to the writing-destination area, from the pool 14, and updates the page management table 1182 in accordance with the allocation (step S41).

The controller 11 copies data of the relevant area which is stored in the PVOL (old data: data of a generation immediately before the current generation which constitutes a snapshot) to the page allocated at step S41 (step S42), and sets the CAW attribute of the relevant area in the difference area management table 1172 to OFF (step S43). Thereby, a snapshot component of the immediately previous generation can be saved into the SVOL which manages a snapshot image of the immediately previous generation. Since this step is a save process for data in one area in the PVOL, the process can be ended in relatively short time.

The controller 11 identifies a generation # associated with the writing-destination area in the PVOL, on the basis of the difference area management table 1172, identifies an SVOL of the generation # on the basis of the pair information management table 1171, allocates a page to an area in the SVOL corresponding to the writing-destination area, from the pool 14, and updates the page management table 1182 in accordance with the allocation (step S44).

The controller 11 copies the data to be written into the PVOL, which is stored in the cache area 121 (a snapshot component of the current generation), to the page allocated at step S44 (step S45), sets the save state of the relevant area in the difference area management table 1172 to "saved", and deletes the generation # (step S46). Thereby, a snapshot component of the current generation can be saved into the SVOL which manages a snapshot image of the current generation. Since this step is a save process for data in the cache area 121 corresponding to one area in the PVOL, the process can be ended in relatively short time.

The controller 11 stores the write data into the cache area 121 of the memory 111 (step S47) and transmits a response to a write request, to the host 2 (step S48). Since the process of this flowchart is only a save process for data corresponding to one area in the PVOL, the process can be ended in relatively short time, and the write response to the host 2 can be relatively fast.

FIG. 18 is a flowchart illustrating a process of the point P. Each step in FIG. 18 will be described below.

The controller 11 refers to the difference area management table 1172 and judges whether or not restore in the writing-destination area in the PVOL is unexecuted (step S51).

If restore has been executed and completed as a result of the judgment at step S51 (step S51: No), the controller 11 advances the process to the point R (FIG. 13). If restore is unexecuted (step S51: Yes), the controller 11 refers to the difference area management table 1172 and judges whether or not data before updating to be stored into the relevant area is unsaved (step S52).

Figure 19:
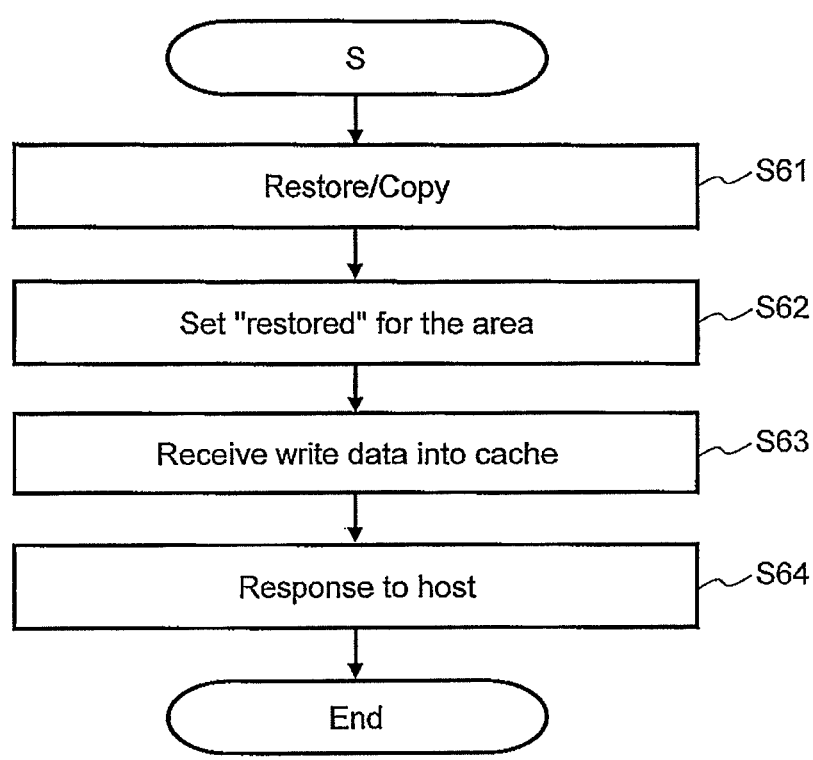
FIG. 19 is a flowchart illustrating a process of a point S.

If the data for the relevant area is already saved as a result of the judgment at step S52 (step S52: No), the process proceeds to a point S (FIG. 19). If the data for the relevant area is unsaved (step S52: Yes), the controller 11 refers to the difference area management table 1172 and judges whether or not the CAW attribute of the slot is ON (step S53).

Figure 20:
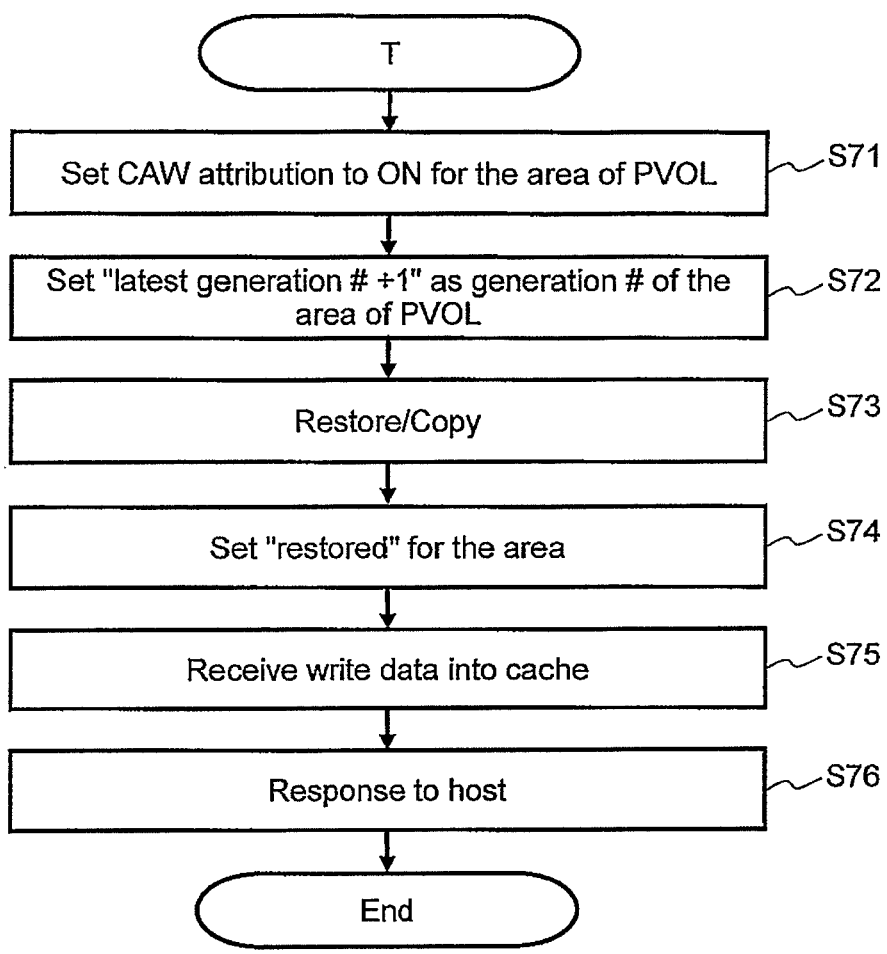
FIG. 20 is a flowchart illustrating a process of a point T.
Figure 21:
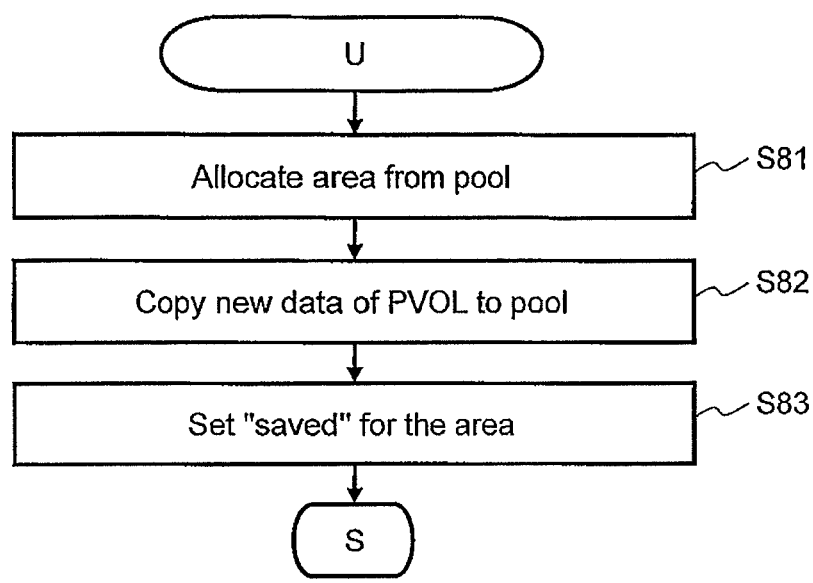
FIG. 21 is a flowchart illustrating a process of a point U.

If the CAW attribute is not ON as a result of the judgment at step S53 (step S53: No), the controller 11 judges whether or not the cache state is host-dirty, that is, whether or not there is data on the W surface of the cache area 121 (step S54). If the cache state is not host-dirty, the controller 11 advances the process to a point T (FIG. 20) (step S54: No). If the cache state is host-dirty (step S54: Yes), the controller 11 advances the process to a point U (FIG. 21).

Figure 22:
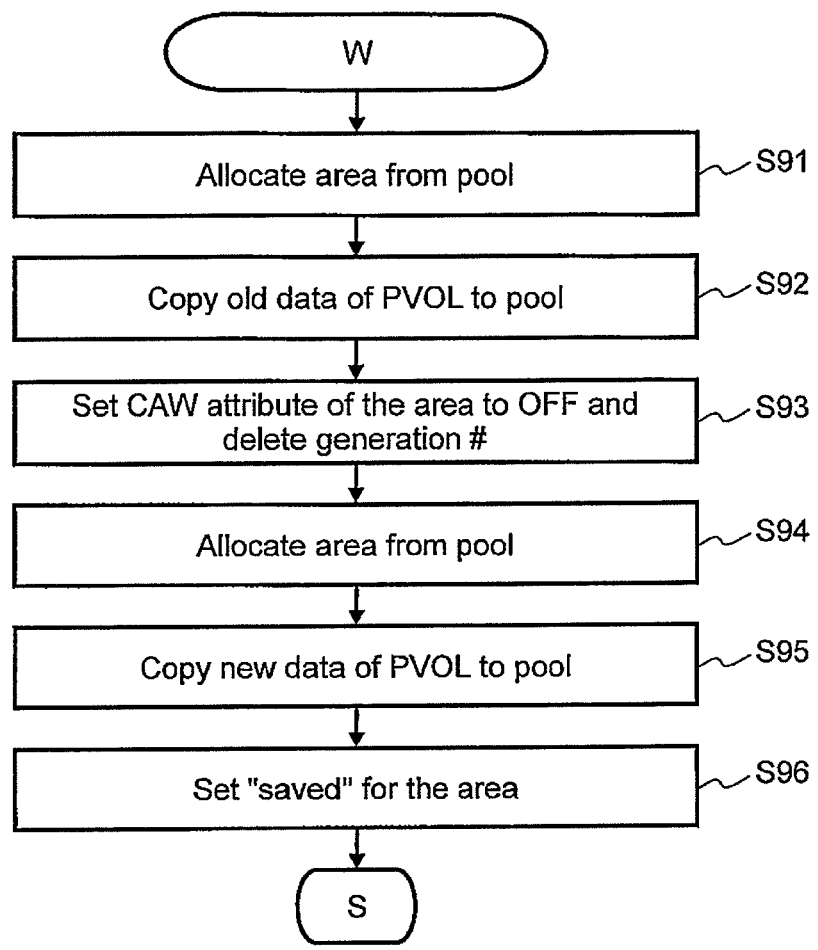
FIG. 22 is a flowchart illustrating a process of a point W.

If the CAW attribute is ON as a result of the judgment at step S53 (step S53: Yes), the controller 11 judges whether or not the generation # of the area is larger than the latest generation # (step S55). If the generation # of the area is larger than the latest generation # (step S55: Yes), the controller 11 advances the process to the point S (FIG. 20). If the generation # of the area is equal to or smaller than the latest generation # (step S55: No), the controller 11 advances the process to a point W (FIG. 22).

FIG. 19 is a flowchart illustrating a process of the point S. Each step in FIG. 19 will be described below.

The controller 11 executes, for the relevant area, restore/copy from an SVOL to the PVOL (step S61) and sets the restore state of the relevant area in the difference area management table 1172 to "restored" (step S62). The controller 11 stores the write data into the cache area 121 of the memory 111 (step S63) and transmits a response to the write request, to the host 2 (step S64).

FIG. 20 is a flowchart illustrating a process of the point T. Each step in FIG. 20 will be described below.

The controller 11 sets a CAW attribute corresponding to the writing-destination area in the difference area management table 1172 to ON (step S71) and sets a value obtained by adding 1 to the latest generation # of the relevant PVOL in the pair information management table 1171 as the generation # of the area (step S72). Thereby, it can be grasped that data in the cache area 121 to be stored into the area is data updated after the time of acquiring the latest snapshot.

The controller 11 executes, for the relevant area, restore/copy from an SVOL to the PVOL (step S73) and sets the restore state of the relevant area in the difference area management table 1172 to "restored" (step S74). The controller 11 stores the write data into the cache area 121 of the memory 111 (step S75) and transmits a response to the write request, to the host 2 (step S76).

FIG. 21 is a flowchart illustrating a process of the point U. Each step in FIG. 21 will be described below.

The controller 11 identifies a generation # associated with the writing-destination area in the PVOL on the basis of the difference area management table 1172, identifies an SVOL of the generation # on the basis of the pair information management table 1171, allocates a page to an area in the SVOL corresponding to the writing-destination area, from the pool 14, and updates the page management table 1182 in accordance with the allocation (step S81).

The controller 11 copies the data of the PVOL, which is stored in the cache area 121, to the area allocated at step S81 (step S82). If the data stored in the cache area 121 is only a part of the data of a slot, the data of the relevant slot in the PVOL is read out onto the R surface of the cache area 121 to make up for a non-existing part of the data of the slot with the data read out onto the R surface, and then the data after the supplementation is copied to the page allocated at step S81.

The controller 11 sets "saved" as a save state corresponding to the area in the difference area management table 1172 (step S83) and advances the process to the point S (FIG. 19).

FIG. 22 is a flowchart illustrating a process of the point W. Each step in FIG. 22 will be described below.

The controller 11 identifies a generation # associated with the writing-destination area in the PVOL on the basis of the difference area management table 1172, identifies an SVOL of an immediately previous generation, that is, an SVOL of the generation # minus 1 on the basis of the pair information management table 1171, and allocates an area to an area in the SVOL corresponding to the writing-destination area, from the pool 14, and updates the page management table 1182 in accordance with the allocation (step S91).

The controller 11 copies data of the relevant area which is stored in the PVOL (old data: data of a snapshot of a generation immediately before the current generation) to the area allocated at step S91 (step S92), sets the CAW attribute of the relevant area in the difference area management table 1172 to OFF, and deletes the generation # (step S93). Thereby, a snapshot component of the immediately previous generation can be appropriately saved into the SVOL which manages a snapshot image of the immediately previous generation. Since this step is a save process for one area in a PVOL, the process can be ended in relatively short time.

The controller 11 identifies a generation # associated with the writing-destination area in the PVOL on the basis of the difference area management table 1172, identifies an SVOL of the generation # on the basis of the pair information management table 1171, allocates an area to an area in the SVOL corresponding to the writing-destination area, from the pool 14, and updates the page management table 1182 in accordance with the allocation (step S94).

The controller 11 copies data in an area corresponding to the PVOL, which is stored in the cache area 121 (data of a snapshot of the current generation) to the area allocated at step S94 (step S95), sets the save state of the relevant area in the difference area management table 1172 to "saved" (step S96), and advances the process to the point S (FIG. 19). Thereby, a snapshot component of the current generation can be appropriately saved into the SVOL which manages a snapshot image of the current generation. Since this step is a save process for a data element in the cache area 121 corresponding to one area in a PVOL, the process can be ended in relatively short time.

Back-End Process by Storage Apparatus 1

Figure 23:
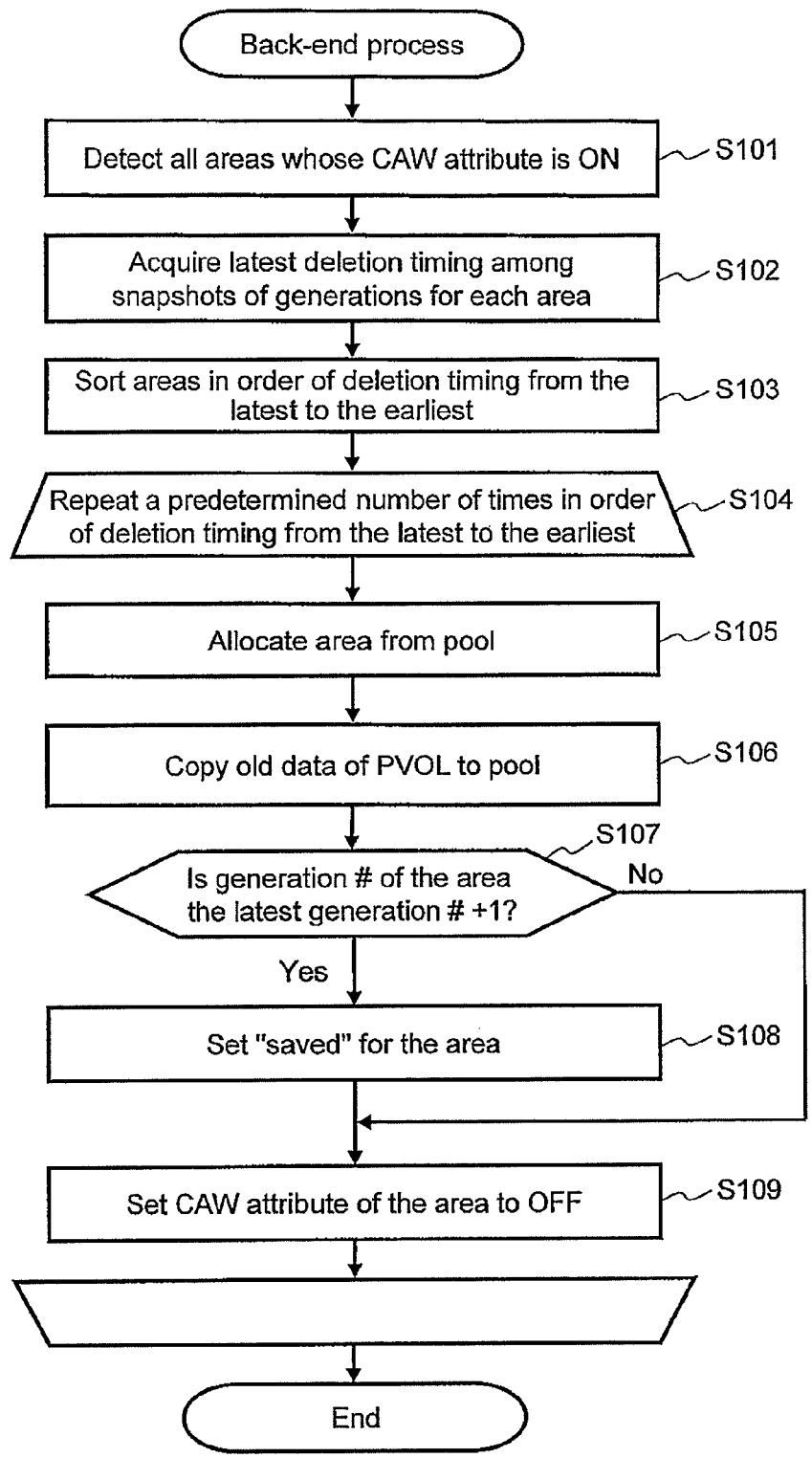
FIG. 23 is a flowchart of a back-end process performed by the storage apparatus 1.

FIG. 23 is a flowchart of a back-end process performed by the storage apparatus 1. This back-end process is executed, for example, at predetermined time intervals or at time when access frequency is low. Each step in FIG. 23 will be described below.

(FIG. 23—Step S101)

The controller 11 refers to the difference area management table 1172 and detects PVOL areas the CAW attribute of which is ON.

(FIG. 23—Step S102)

The controller 11 refers to the pair information management table 1171 and identifies such a snapshot that the deletion timing is the latest when seen on the current date and time (the deletion timing is the farthest in the future from the current date and time), among snapshots corresponding to the areas detected at step S101 including snapshots of old generations.

(FIG. 23—Step S102: Supplementation 1)

Even if a snapshot the deletion timing of which is close to the current date and time is saved into an SVOL, the snapshot is deleted immediately, and it becomes unnecessary to create a snapshot for that PVOL area after that. Therefore, such save will be a waste of waiting time and the like required for the save. Therefore, in this first embodiment, a snapshot the deletion timing of which is the latest when seen on the current date and time, that is, such a snapshot that a process for saving it into an SVOL is the least wasteful if the process is performed is preferentially saved into an SVOL. This step is significant in identifying a save target therefor. In other words, the storage apparatus 1 according to this first embodiment regards the deletion timing in the pair information management table 1171 as deletion priority and preferentially saves a snapshot with a low deletion priority into an SVOL.

(FIG. 23—Step S102: Supplementation 2)

It can be thought that, while a snapshot the deletion timing of which is as late as possible is preferentially saved into an SVOL, a snapshot the deletion timing is near is deleted when the deletion timing comes, and it becomes unnecessary to create a snapshot after that. It can be thought that, as a result, the frequency of saving a snapshot decreases, and time during which write data stays on a cache memory can be shortened. This leads to reduction in the amount of the cache memory used. Therefore, it happens less often that switching to a COW operation is caused because the allowed amount of the cache memory used is exceeded due to the CAW operation, and deterioration in I/O performance accompanying the COW operation can be suppressed.

(FIG. 23—Step S102: Supplementation 3)

It is because it is necessary to continue creating a snapshot of a corresponding PVOL area as far as a snapshot of any generation remains that, at this step, a snapshot the deletion timing of which is the latest is identified from among snapshots including snapshots of old generations. In comparison, as for a PVOL area from which snapshots of all generations have been deleted, it is not necessary to create a snapshot. From the above reason, the deletion timings of snapshots including snapshots of old generations are acquired at this step.

(FIG. 23—Steps S103 and S104)

The controller 11 sorts the areas detected at step S101 in order of deletion timing from the latest to the earliest (in the order of descending save priorities) (S103). The controller 11 performs steps S105 to S109 below for the areas in the order of descending save priorities. It is not necessarily required to perform the following steps for all the areas detected at step S101. The following steps may be performed for a predetermined number of areas.

(FIG. 23—Steps S105 and S106)

The controller 11 identifies a generation # associated with the area detected at step S101, on the basis of the difference area management table 1172, identifies an SVOL of the generation # minus 1 on the basis of the pair information management table 1171, allocates an area to an area in the SVOL from the pool 14, and updates the page management table 1182 in accordance with the allocation (step S105). The controller 11 copies data of the relevant area which is stored in the PVOL to the area allocated at step S105 (step S106).

(FIG. 23—Steps S107 and S108)

The controller 11 judges whether or not the generation # of the area copies at step S106 is the latest generation # plus 1 (step S107), and, if the generation # of the area is the latest generation # plus 1 (step S107: Yes), sets "saved" as a save state corresponding to the area in the difference area management table 1172 (step S108). If the generation # of the area is not the latest generation # plus 1 (step S107: No), the controller 11 does not do anything.

(FIG. 23—Step S109)

The controller 11 sets a CAW attribute corresponding to the area in the difference area management table 1172 to OFF. Thereby, it is possible to save data of an area the CAW attribute of which is ON in the PVOL into an SVOL using a back-end process performed in asynchronization with an I/O request. Furthermore, by saving data of an area in the PVOL into an SVOL, it is possible to reduce occurrence of a situation in which, in the PVOL write process, data of a PVOL area must be saved into an SVOL before storing write data into the cache area 121, for example, a situation corresponding to "step S7: No" and it is possible to improve write response.

Read Process by Storage Apparatus 1

Figure 24:
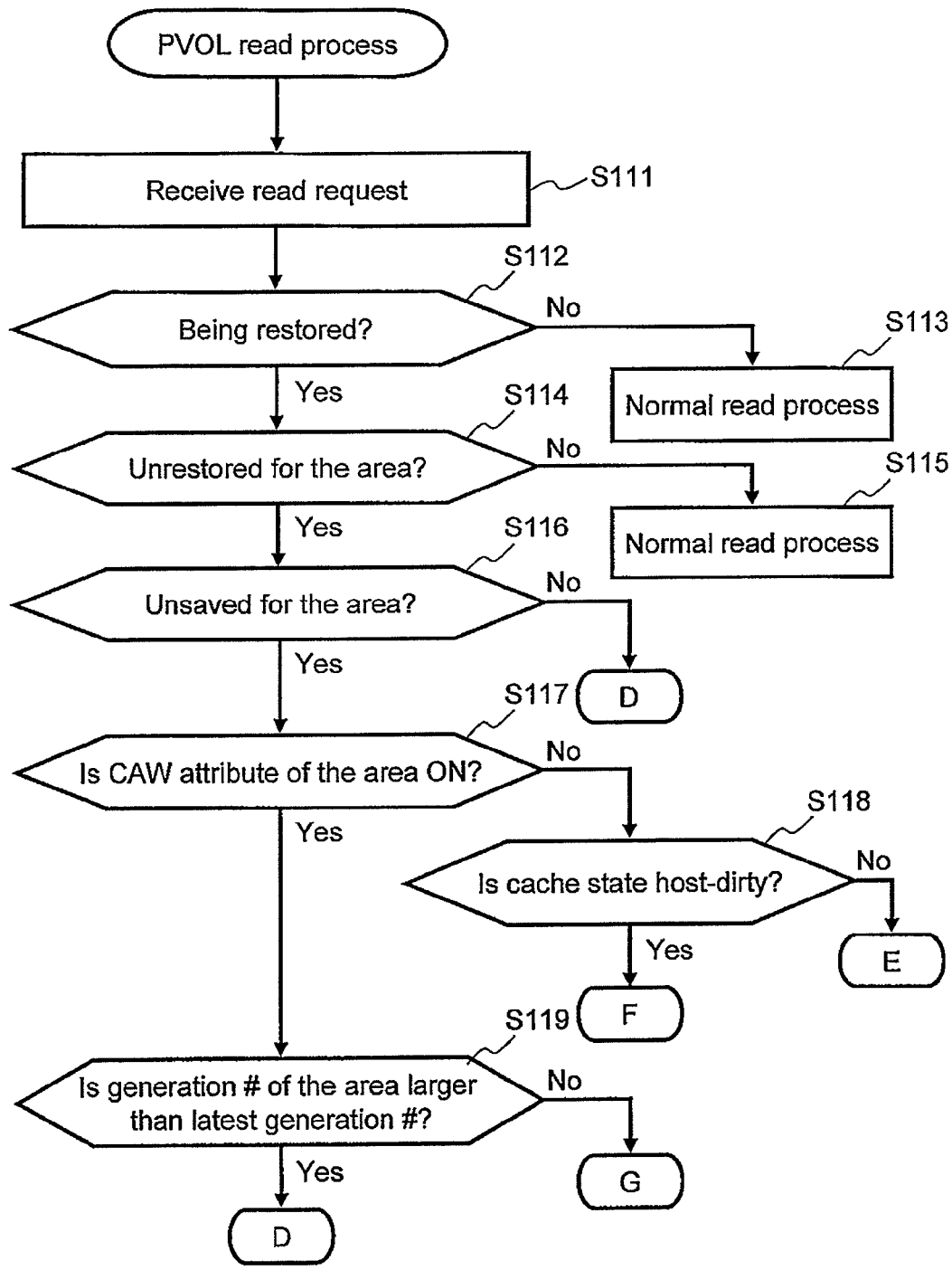
FIG. 24 is a flowchart illustrating a read process for the storage apparatus 1 to read data from the PVOL.

FIG. 24 is a flowchart illustrating a read process for the storage apparatus 1 to read data from a PVOL. Each step in FIG. 24 will be described below.

When receiving a read request from the host 2 (step S111), the controller 11 judges whether or not a PVOL corresponding to the read request is being restored (step S112) by referring to the status of the read-target PVOL in the pair information management table 1171.

If the PVOL is not being restored as a result of the judgment at step S112 (step S112: No), the controller 11 executes a normal read process for reading out data from a relevant PVOL area (or the cache area 121 storing the data of the area) (step S113). If the PVOL is being restored (step S112: Yes), the controller 11 refers to the difference area management table 1172 and judges whether or not restore in a PVOL slot corresponding to the read request is unexecuted (step S114).

If restore has been completed as a result of the judgment at step 114 (step S114: No), the controller 11 executes the normal read process (step S115). If restore is unexecuted (step S114: Yes), the controller 11 refers to the difference area management table 1172 and judges whether or not the relevant slot is unsaved, that is, whether or not data before updating corresponding to the data in the cache area 121 which is to be written into the slot is unsaved (step S116).

Figure 25:
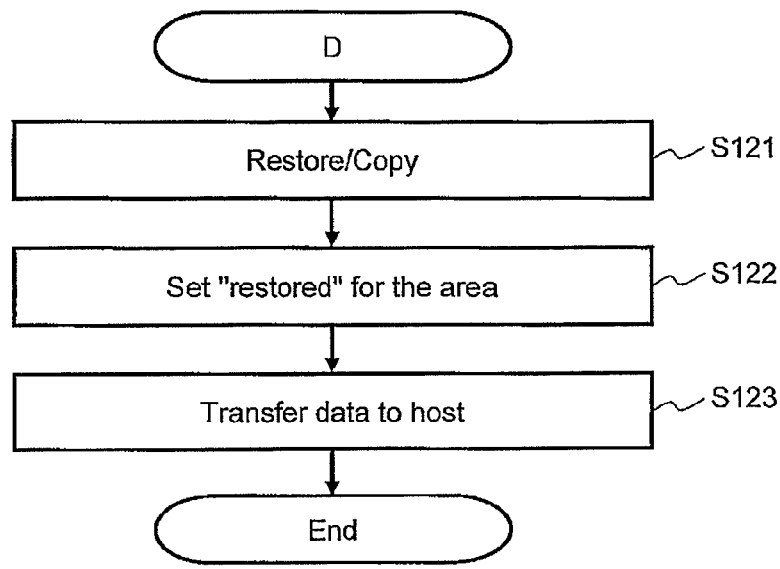
FIG. 25 is a flowchart illustrating a process of a point D.

If the data is not unsaved as a result of the judgment at step 116 (step S116: No), the controller 11 advances the process to a point D (FIG. 25). If the data is unsaved (step S116: Yes), the controller 11 refers to the difference area management table 1172 and judges whether or not the CAW attribute of the slot is ON (step S117).

If the CAW attribute is not ON as a result of the judgment at step S117 (step S117: No), the controller 11 judges whether or not the cache state is host-dirty, that is, whether or not there is data on the W surface of the cache area 121 (step S118).

Figure 26:
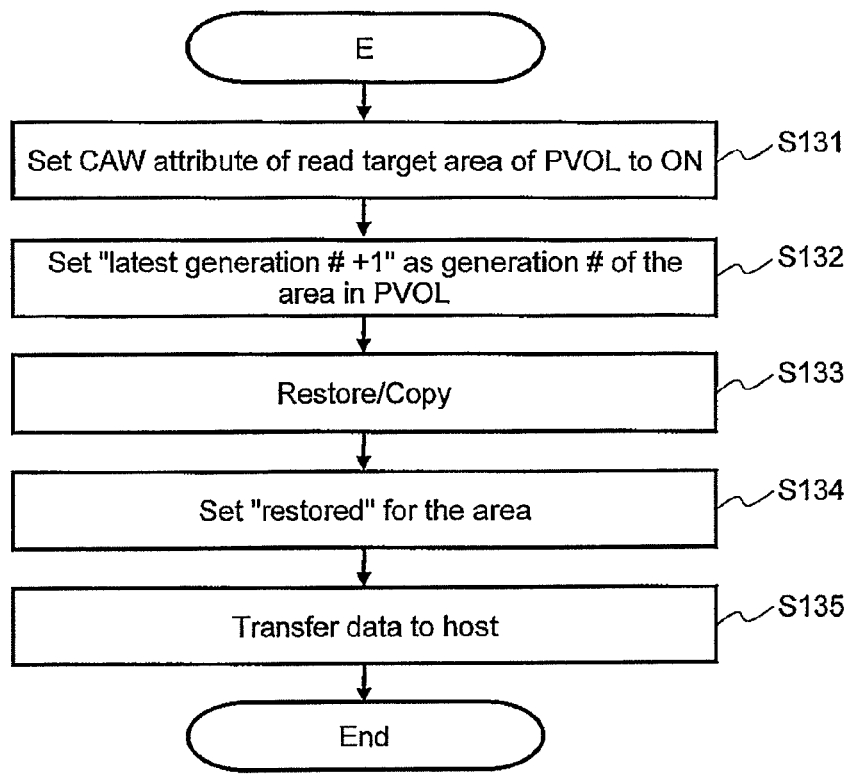
FIG. 26 is a flowchart illustrating a process of a point E.
Figure 27:
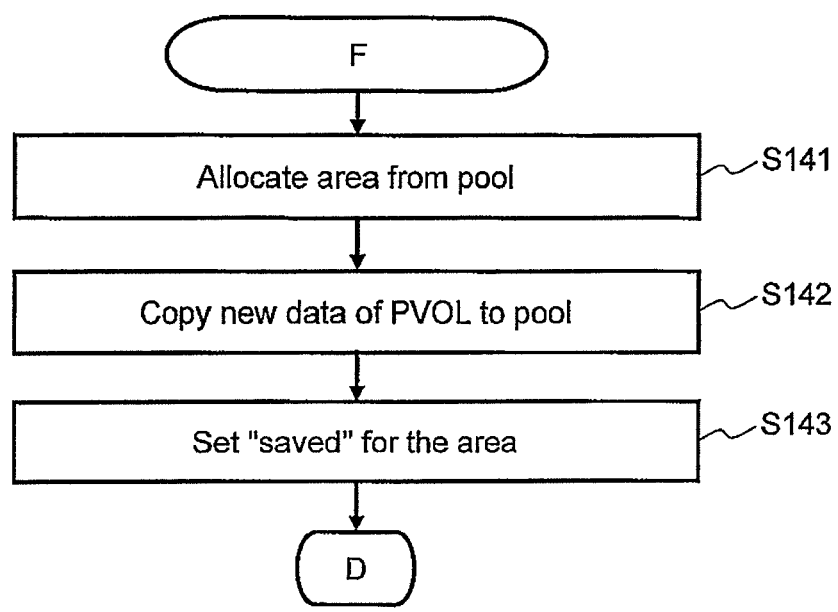
FIG. 27 is a flowchart illustrating a process of a point F.

If the data is not host-dirty as a result of the judgment at step 118 (step S118: No), the controller 11 advances the process to a point E (FIG. 26). If the cache state is host-dirty (step S118: Yes), the controller 11 advances the process to a point F (FIG. 27).

If the CAW attribute is ON as a result of the judgment at step S117 (step S117: Yes), the controller 11 judges whether or not the generation # of the slot is larger than the latest generation # (step S119).

Figure 28:
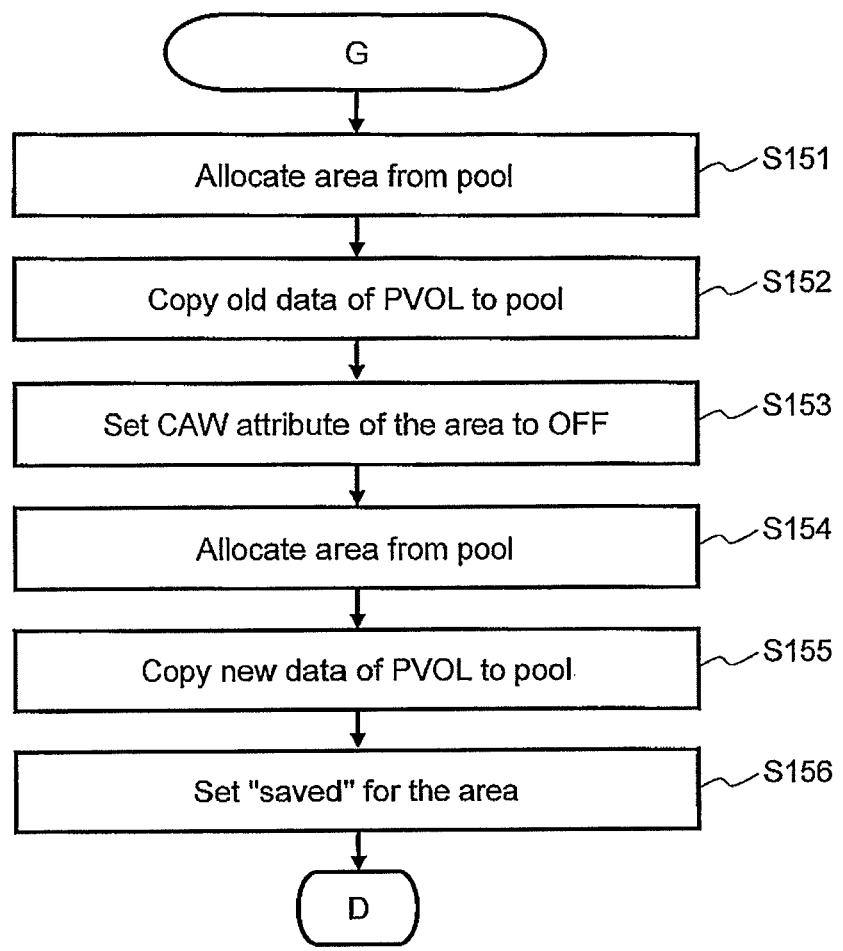
FIG. 28 is a flowchart illustrating a process of a point G.

If the generation # of the slot is larger than the latest generation # as a result of the judgment at step 119 (step S119: Yes), the controller 11 advances the process to the point D (FIG. 25). If the generation # of the area is equal to or smaller than the latest generation # (step S119: No), the controller 11 advances the process to a point G (FIG. 28).

FIG. 25 is a flowchart illustrating a process of the point D. Each step in FIG. 25 will be described below.

The controller 11 executes, for the relevant slot, restore/copy from an SVOL to the PVOL (step S121) and sets the restore state of the relevant slot in the difference area management table 1172 to "restored" (step S122). The controller 11 reads out the relevant area in the PVOL and transmits it to the host 2 (step S123).

FIG. 26 is a flowchart illustrating a process of the point E. Each step in FIG. 26 will be described below.

The controller 11 sets the CAW attribute of the slot which includes the area corresponding to the read request in the difference area management table 1172 to ON (step S131) and sets a value obtained by adding 1 to the latest generation # of the relevant PVOL in the pair information management table 1171 as the generation # of the area (step S132).

The controller 11 executes, for the relevant area, restore/copy from an SVOL to the PVOL (step S133) and sets the restore state of the relevant area in the difference area management table 1172 to "restored" (step S134). The controller 11 reads out the relevant area in the PVOL and transmits it to the host 2 (step S135).

FIG. 27 is a flowchart illustrating a process of the point F. Each step in FIG. 27 will be described below.

The controller 11 identifies a generation # associated with the slot which includes the read-target PVOL area, on the basis of the difference area management table 1172, identifies an SVOL of the generation # on the basis of the pair information management table 1171, allocates a page to an SVOL area corresponding to the read-target area, from the pool 14, and updates the page management table 1182 in accordance with the allocation (step S141).

The controller 11 copies data to be written into the PVOL, which is stored in the cache area 121, to the page allocated at step S141 (step S142). If the data stored in the cache area 121 is only a part of the data of a slot, the data of the relevant slot in the PVOL is read out onto the R surface of the cache area 121 to make up for the non-existing part of the data of the slot with the data read out onto the R surface, and then copy the data after the supplementation is copied to the page allocated at step S141.

The controller 11 sets "saved" as a save state corresponding to the slot in the difference area management table 1172 (step S143) and advances the process to the point D (FIG. 25).

FIG. 28 is a flowchart illustrating a process of the point G. Each step in FIG. 28 will be described below.

The controller 11 identifies a generation # associated with the slot which includes the read-target PVOL area, on the basis of the difference area management table 1172, identifies an SVOL of an immediately previous generation, that is, an SVOL of the generation # minus 1 on the basis of the pair information management table 1171, and allocates a page to an area in the SVOL corresponding to the read-target area, from the pool 14, and updates the page management table 1182 in accordance with the allocation (step S151).

The controller 11 copies data of the relevant area which is stored in the PVOL (old data: data constituting a snapshot of a generation immediately before the current generation) to the area allocated at step S151 (step S152), and sets the CAW attribute of the relevant area in the difference area management table 1172 to OFF (step S153). Thereby, a snapshot component of the immediately previous generation can be appropriately saved into the SVOL which manages a snapshot image of the immediately previous generation. Since this step is a save process for a data element in one area in the PVOL, the process can be ended in relatively short time.

The controller 11 identifies a generation # associated with the read-target PVOL area, on the basis of the difference area management table 1172, identifies an SVOL of the generation # on the basis of the pair information management table 1171, allocates a page to an SVOL area corresponding to the read-target area, from the pool 14, and updates the page management table 1182 in accordance with the allocation (step S154).

The controller 11 copies data in an area corresponding to the PVOL, which is stored in the cache area 121 (a snapshot component of the current generation) to the page allocated at step S154 (step S155), sets the save state of the relevant area in the difference area management table 1172 to "saved" (step S156), and advances the process to the point D (FIG. 25). Thereby, a snapshot component of the current generation can be appropriately saved into the SVOL which manages a snapshot image of the current generation. Since this step is a save process for a data element in the cache area 121 corresponding to one area in the PVOL, the process can be ended in relatively short time.

SVOL Read Process by Storage Apparatus 1

Figure 29:
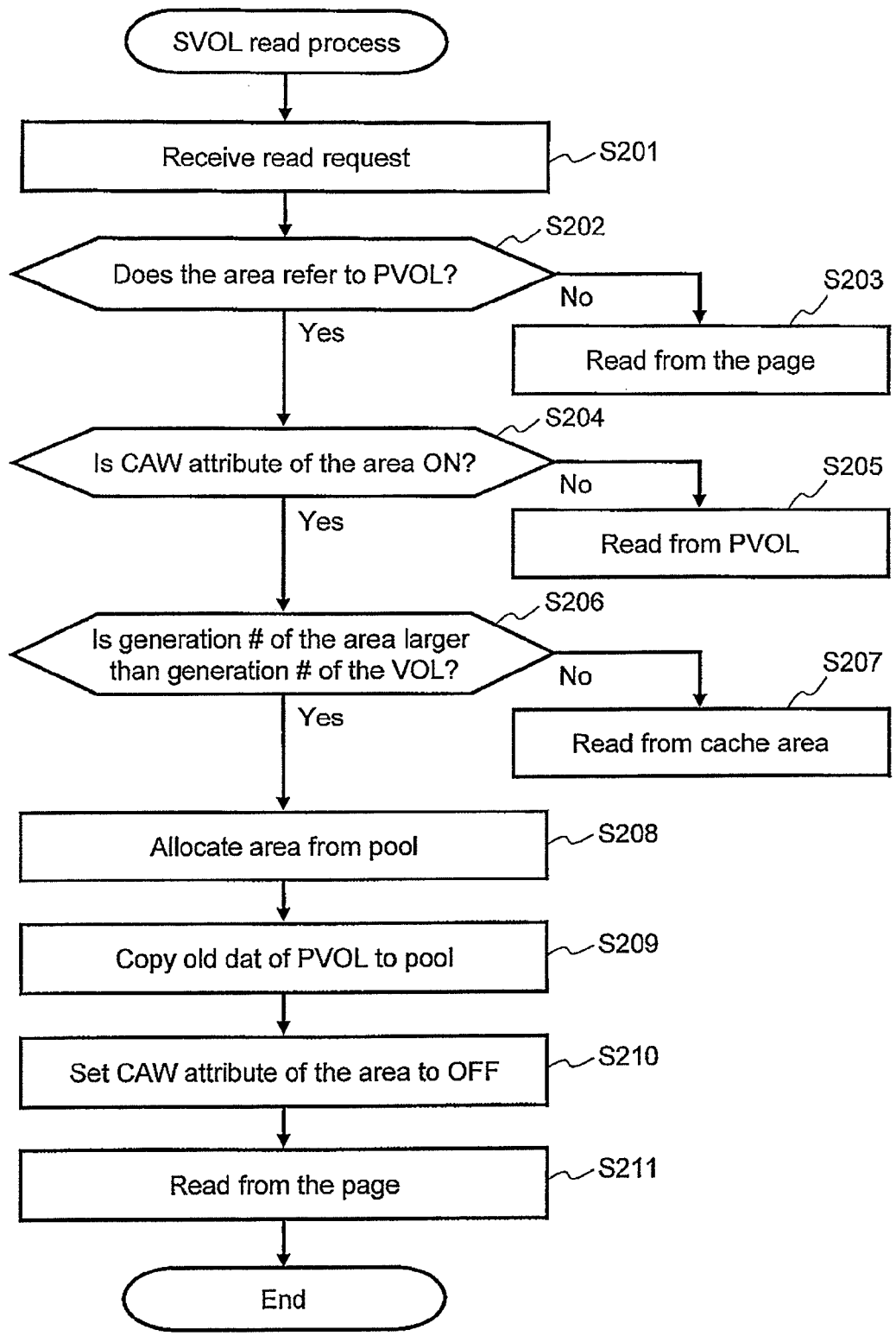
FIG. 29 is a flowchart illustrating an SVOL read process for the storage apparatus 1 to read data from an SVOL.

FIG. 29 is a flowchart illustrating a SVOL read process for the storage apparatus 1 to read data from an SVOL. Each step in FIG. 29 will be described below.

When receiving a read request from the host 2 (step S201), the controller 11 judges whether or not an SVOL area (page) corresponding to the read request is referring to a PVOL (step S202), by referring to the address management table 1181.

If the SVOL area is not referring to the PVOL as a result of the judgment at step 202 (step S202: No), the controller 11 reads out data from a page associated with the SVOL (read) and transmits the data to the host 2 (step S203). If the SVOL area is referring to the PVOL (step S202: Yes), the controller 11 refers to the difference area management table 1172 and judges whether or not the CAW attribute of a PVOL slot corresponding to the area in the SVOL is ON (step S204).

If the CAW attribute is not ON as a result of the judgment at step S204 (step S204: No), the controller 11 reads data from the relevant slot of the relevant PVOL and transmits the data to the host 2 (step S205). If the CAW attribute is ON (step S204: Yes), the controller 11 judges whether or not the generation # of the slot is larger than the generation # of the SVOL (step S206).

If the generation # of the slot is equal to or smaller than the generation # of the SVOL as a result of the judgment at step S206 (step S206: No), the data stored in the cache area 121 is data before the time point of acquiring the snapshot of the SVOL, and, therefore, the controller 11 reads the data from the cache area 121 corresponding to the PVOL area and transmits the data to the host 2 (step S207).

If the generation # of the slot is larger than the generation # of the SVOL as a result of the judgment at step S206 (step S206: Yes), the data stored in the cache area 121 is data after the time point of acquiring the snapshot of the SVOL, and, therefore, the controller 11 allocates a page to the area in the SVOL area from the pool 14 and updates the page management table 1182 in accordance with the allocation (step S208).

The controller 11 copies data of the relevant area which is stored in the PVOL (old data: data constituting a snapshot of a generation immediately before the current generation) to the area allocated at step S208 (step S209), sets the CAW attribute of the relevant area in the difference area management table 1172 to OFF (step S210), reads out data from a page associated with the read-target SVOL area (read), and transmits the data to the host 2 (step S211).

SVOL Write Process by Storage Apparatus 1

Figure 30:
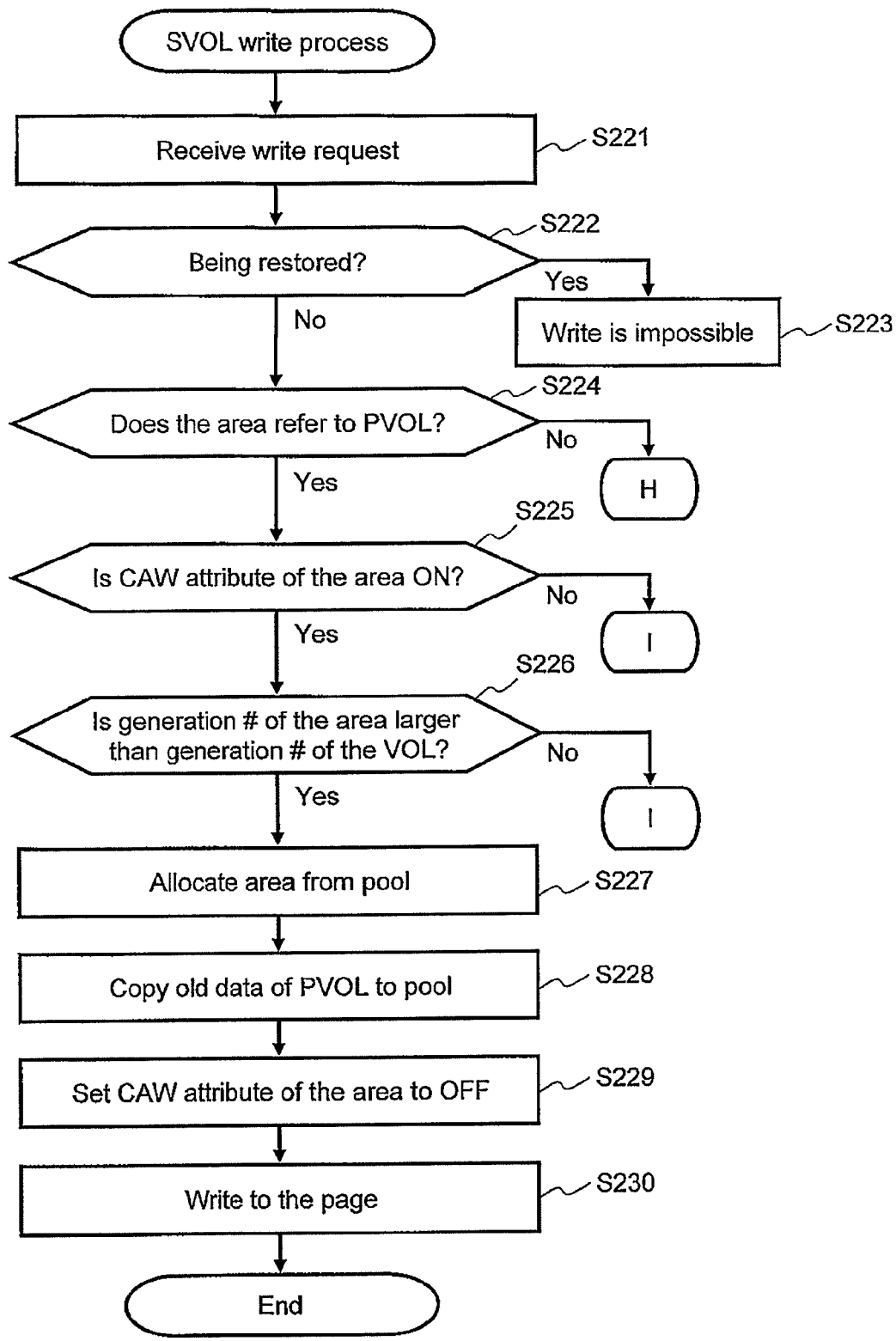
FIG. 30 is a flowchart illustrating an SVOL write process for the storage apparatus 1 to write data into an SVOL.

FIG. 30 is a flowchart illustrating an SVOL write process for the storage apparatus 1 to write data into an SVOL. Each step in FIG. 30 will be described below.

When receiving a write request from the host 2 (step S221), the controller 11 judges whether or not a writing-destination SVOL is being restored (step S5222) by referring to a status associated with the writing-destination SVOL in the pair information management table 1171.

If the SVOL is being restored as a result of the judgment at step 222 (step S222: Yes), the controller 11 does not execute write (step S223). If the SVOL is not being restored (step S222: No), the controller 11 judges whether or not the writing-destination SVOL area is referring to the PVOL (step S224) by referring to the address management table 1181.

Figure 31:
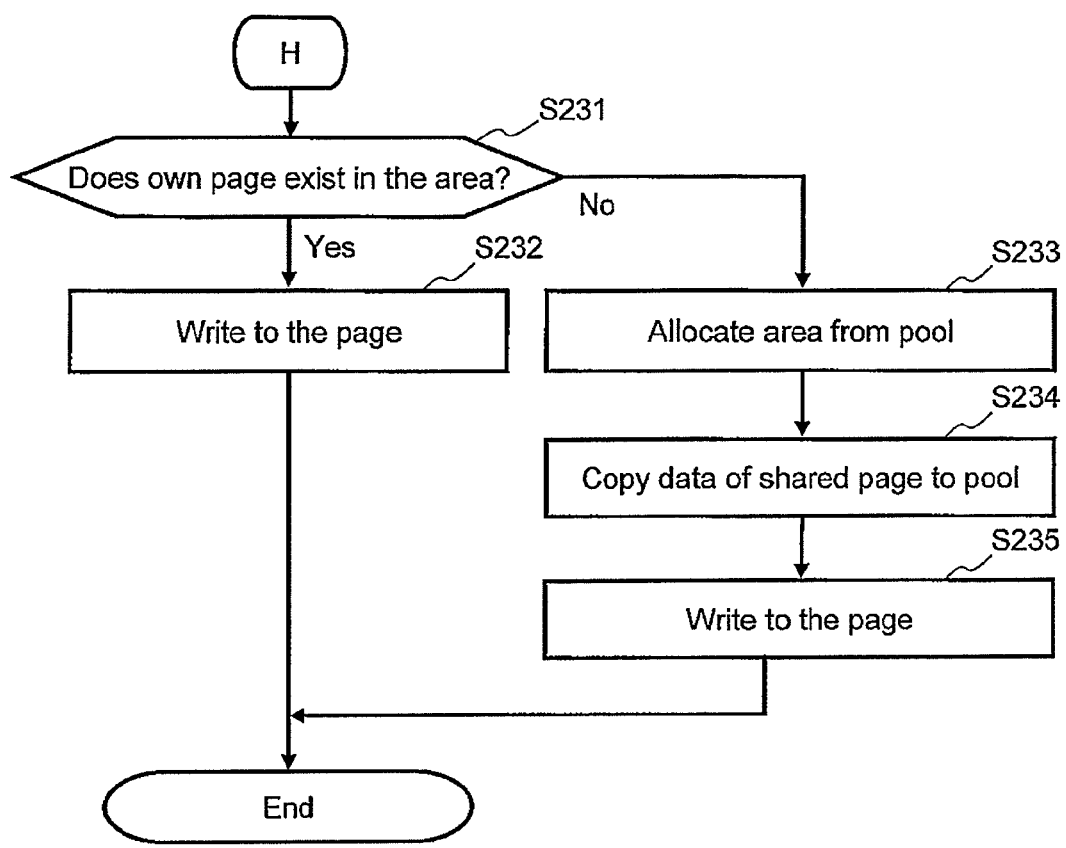
FIG. 31 is a flowchart illustrating a process of a point H.

If the SVOL is not referring to the PVOL as a result of the judgment at step S224 (step S224: No), the controller 11 advances the process to a point H (FIG. 31). If the SVOL is referring to the PVOL (step S224: Yes), the controller 11 refers to the difference area management table 1172 and judges whether or not the CAW attribute of the slot is ON (step S225).

Figure 32:
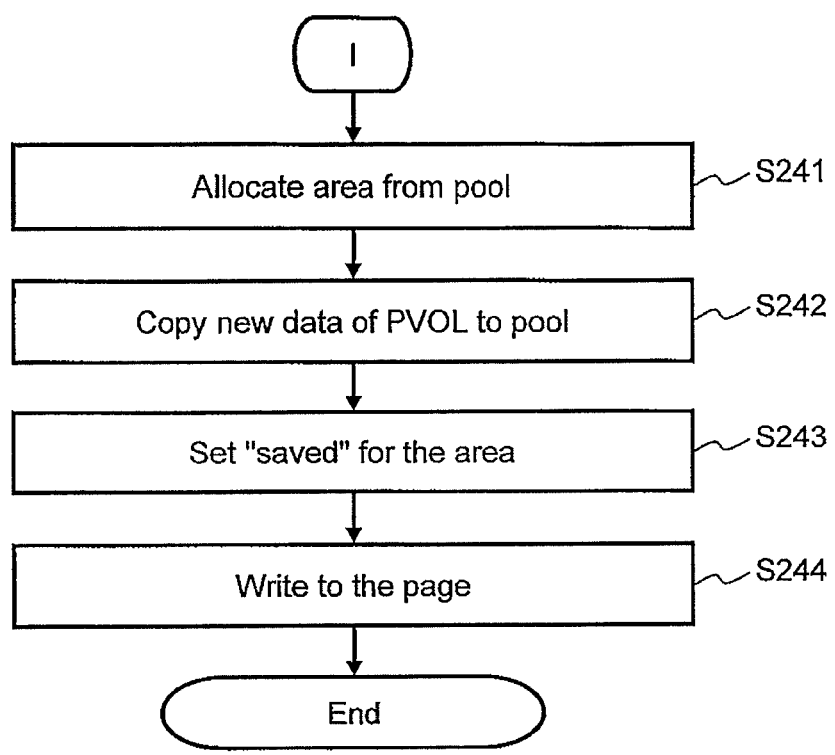
FIG. 32 is a flowchart illustrating a process of a point I.

If the CAW attribute is not ON as a result of the judgment at step S225 (step S225: No), the controller 11 advances the process to a point I (FIG. 32). If the CAW attribute is ON (step S225: Yes), the controller 11 judges whether or not the generation # of the slot is larger than the generation # of the SVOL (step S226).

If the generation # of the slot is equal to or smaller than the generation # of the SVOL as a result of the judgment at step 226 (step S226: No), the controller 11 advances the process to the point I (FIG. 32). If the generation # of the area is larger than the generation # of the SVOL (step S226: Yes), the controller 11 allocates a page to an SVOL area corresponding to a writing-destination area from the pool 14 and updates the page management table 1182 in accordance with the allocation (step S227).

The controller 11 copies data of the relevant area in the relevant PVOL (old data: data constituting a snapshot of a generation immediately before the current generation) to the area allocated at step S227 (step S228), sets the CAW attribute of the relevant area in the difference area management table 1172 to OFF (step S229), writes the write data into a page associated with the writing-destination SVOL area, and transmits a response to the host 2 (step S230).

FIG. 31 is a flowchart illustrating a process of the point H. Each step in FIG. 31 will be described below.

The controller 11 refers to the address management table 1181 and judges whether or not an own page exists in the write-target SVOL area (step S231).

If the own page exists as a result of the judgment at step 231 (step S231: Yes), the controller 11 writes the write data into the own page and transmits a response to the host 2 (step S232).

If the own page does not exist as a result of the judgment at step S231 (step S231: No), the controller 11 allocates a page to the writing-destination SVOL area from the pool 14 on the basis of the difference area management table 1172, updates the address management table 1181 in accordance with the allocation (step S233), and copies data of a shared page of the relevant area to the page allocated at step S233 (step S234). The controller 11 copies the write data to the own page and transmits a response to the host 2 (step 235).

FIG. 32 is a flowchart illustrating a process of the point I. Each step in FIG. 32 will be described below.

The controller 11 allocates a page to the writing-destination SVOL area from the pool 14 on the basis of the difference area management table 1172 and updates the page management table 1182 in accordance with the allocation (step S241). The controller 11 copies data in the cache area 121 corresponding to the SVOL area (data constituting a snapshot of the current generation) to the area allocated at step S241 (step S242), sets the save state of the relevant area in the difference area management table 1172 to "saved" (step S243), writes the write data into the page and transmits a response to the host 2 (step S244).

Snapshot Acquisition Process by Storage Apparatus 1

Figure 33:
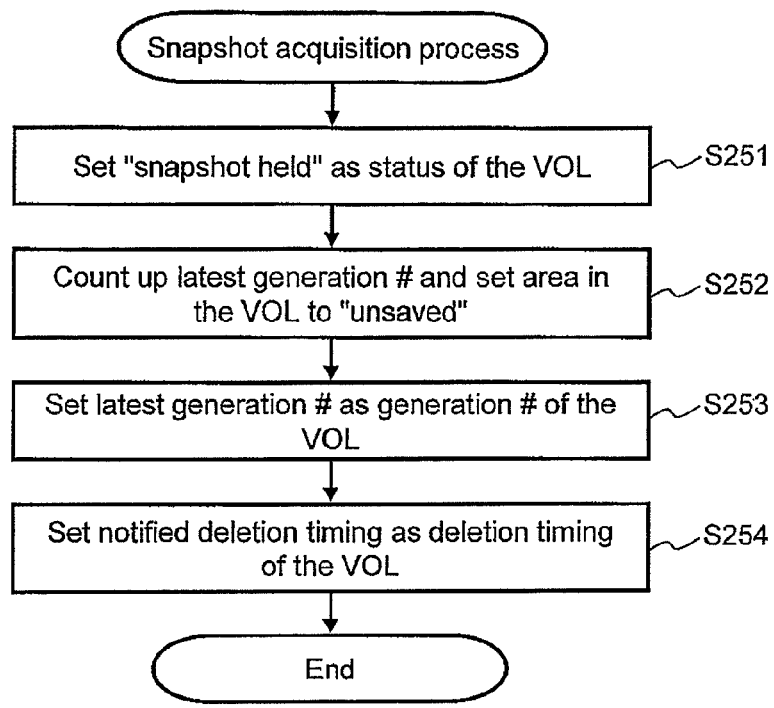
FIG. 33 is a flowchart of a process for the storage apparatus 1 to acquire a snapshot.

FIG. 33 is a flowchart of a process for the storage apparatus 1 to acquire a snapshot. The snapshot acquisition process is executed, for example, at preset time or when there is a snapshot acquisition request from the host 2 or the like. Each step in FIG. 33 will be described below.

The controller 11 sets, for a snapshot-acquisition-target PVOL, the status of an SVOL area which holds the next snapshot to "snapshot held" in the pair information management table 1171 (step S251).

The controller 11 counts up the latest generation # of the relevant area and sets the save state corresponding to the relevant area in the difference area management table 1172 to "unsaved" (step S252).

The controller 11 sets the latest generation # as the generation # of the SVOL (step S253). The controller 11 sets deletion timing notified from the backup agent 21 as the deletion timing of the SVOL (S254).

As described above, in this first embodiment, it is not necessary to perform a process for saving or the like of data of a PVOL area in the process for acquiring the next snapshot, and it is possible to access the PVOL in a short time.

Snapshot Deletion Process by Storage Apparatus 1

Figure 34:
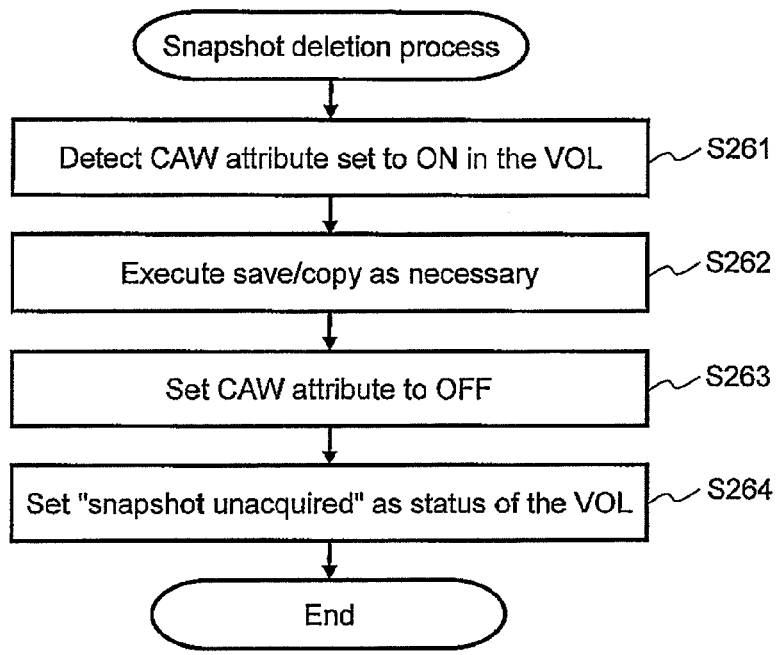
FIG. 34 is a flowchart of a process for the storage apparatus 1 to delete a snapshot.

FIG. 34 is a flowchart of a process for the storage apparatus 1 to delete a snapshot. The snapshot deletion process is executed, for example, when there is a snapshot deletion request from the host 2 or the like. Each step in FIG. 34 will be described below.

The controller 11 detects, for a PVOL corresponding to an SVOL targeted by snapshot deletion, an area the CAW attribute of which is ON from the difference area management table 1172 (step S261) and executes, for the area the CAW attribute of which is ON, save/copy as necessary (step S262). Specifically, as for data of an area stored by the SVOL to be deleted and referred to by another snapshot, the data is saved and copied into the SVOL area which refers to the area.

For the saved area in the PVOL, the controller 11 sets the CAW attribute in the difference area management table 1172 to OFF (step S263) and sets the status of the relevant SVOL in the pair information management table 1171 to "snapshot un-acquired" (step S264).

Conclusion

As described above, the storage apparatus 1 according to this first embodiment preferentially saves such a storage area that the timing of deleting a snapshot is as late as possible when seen on the current date and time, into an SVOL while performing a CAW operation. Thereby, it is possible to reduce the frequency of saving a snapshot into an SVOL and shorten the time of write data staying on a cache memory. Therefore, it is possible to suppress occurrence of a situation in which, because the amount of the cache memory used exceeds a predetermined threshold, switching to a COW operation is caused, and it is possible to suppress deterioration in I/O performance accompanying the situation.

Second Embodiment

In a second embodiment of the present invention, a variation of the computer system 1000 described in the first embodiment will be described. In a computer system 1000 according to the second embodiment, an area for temporarily storing write data (a temporary area) is further provided in the cache area 121 in the storage apparatus 1 of the first embodiment.

System Configuration

Figure 35:
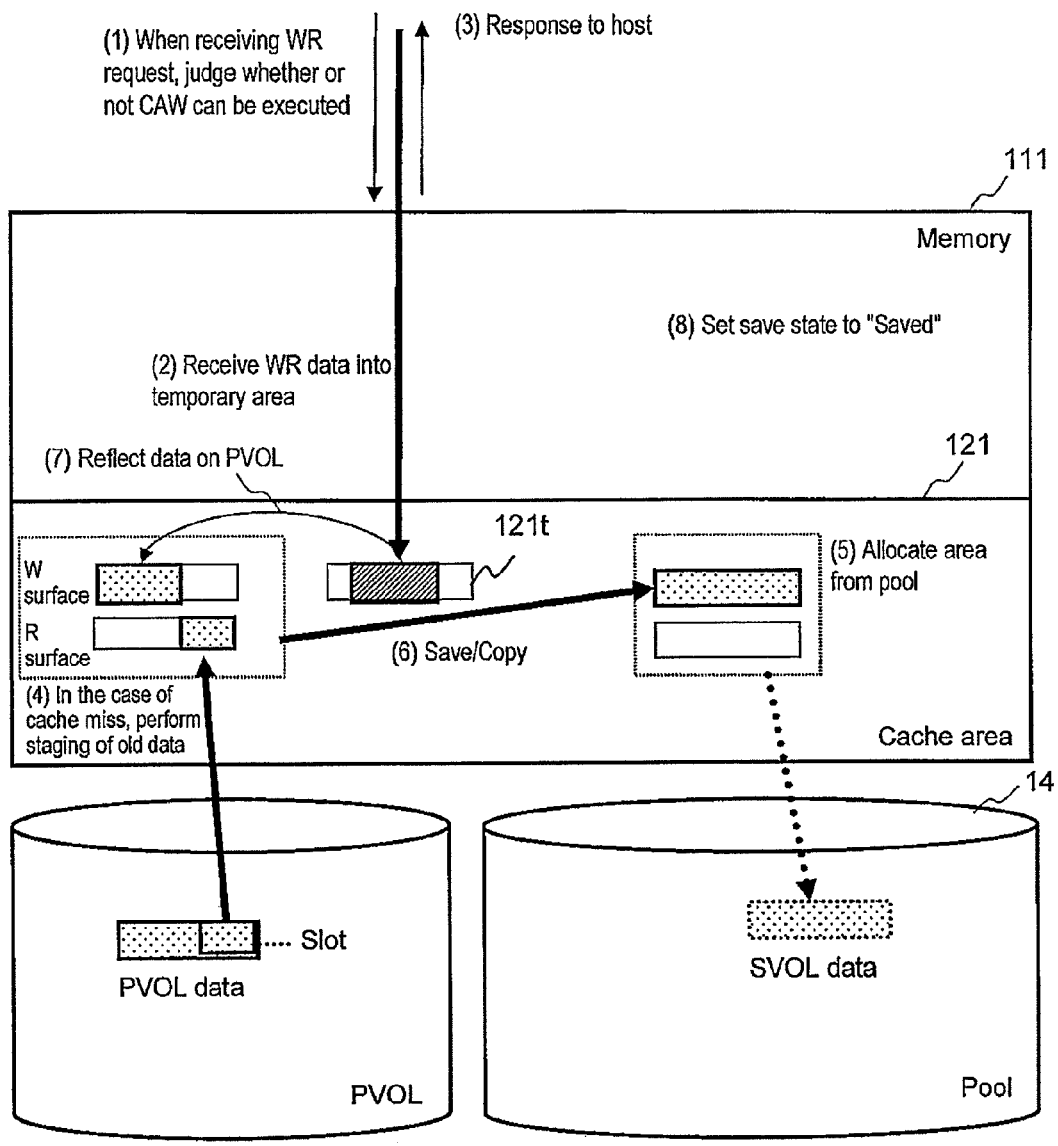
FIG. 35 is a diagram illustrating the outline of a PVOL write process in a second embodiment.

FIG. 35 is a diagram illustrating the outline of a PVOL write process in this second embodiment. Each step shown in FIG. 35 will be described below.

When receiving a write (WR) request from the host 2, the storage apparatus 1 judges whether or not CAW can be executed (step 1). If the status of a relevant area in the pair information management table 1171 is "snapshot held" and the data in the relevant area is unsaved, the storage apparatus 1 receives write data (WR data) and writes it into a temporary area 121t in the cache area 121 (step 2). The storage apparatus 1 transmits a response to the write request, to the host 2 (step 3). Thereby, the write response to the host 2 can be improved.

The storage apparatus 1 executes a back-end process in asynchronization with steps 1 to 3 and detects a CAW attribute of the PVOL area. If the CAW attribute is ON, the storage apparatus 1 judges whether or not data before updating in a writing-destination area has been cached on the read surface (R surface) of the cache area ahead. In the case of cache miss, staging of a slot which includes the relevant PVOL area is performed, that is, the data is read out onto the R surface of the cache area 121 (step 4).

The storage apparatus 1 allocates an area (page) from the pool 14 as a corresponding SVOL area (step 5) and saves and copies data read out onto the R surface of the cache area 121 into the area (step 6). The storage apparatus 1 reflects the write data stored in the temporary area 121t of the cache area 121, on the cache area 121 corresponding to the PVOL (step 7) and sets "saved" as the save state of the area in the difference area management table 1172 (step 8).

Write Process by Storage Apparatus 1

Figure 36:
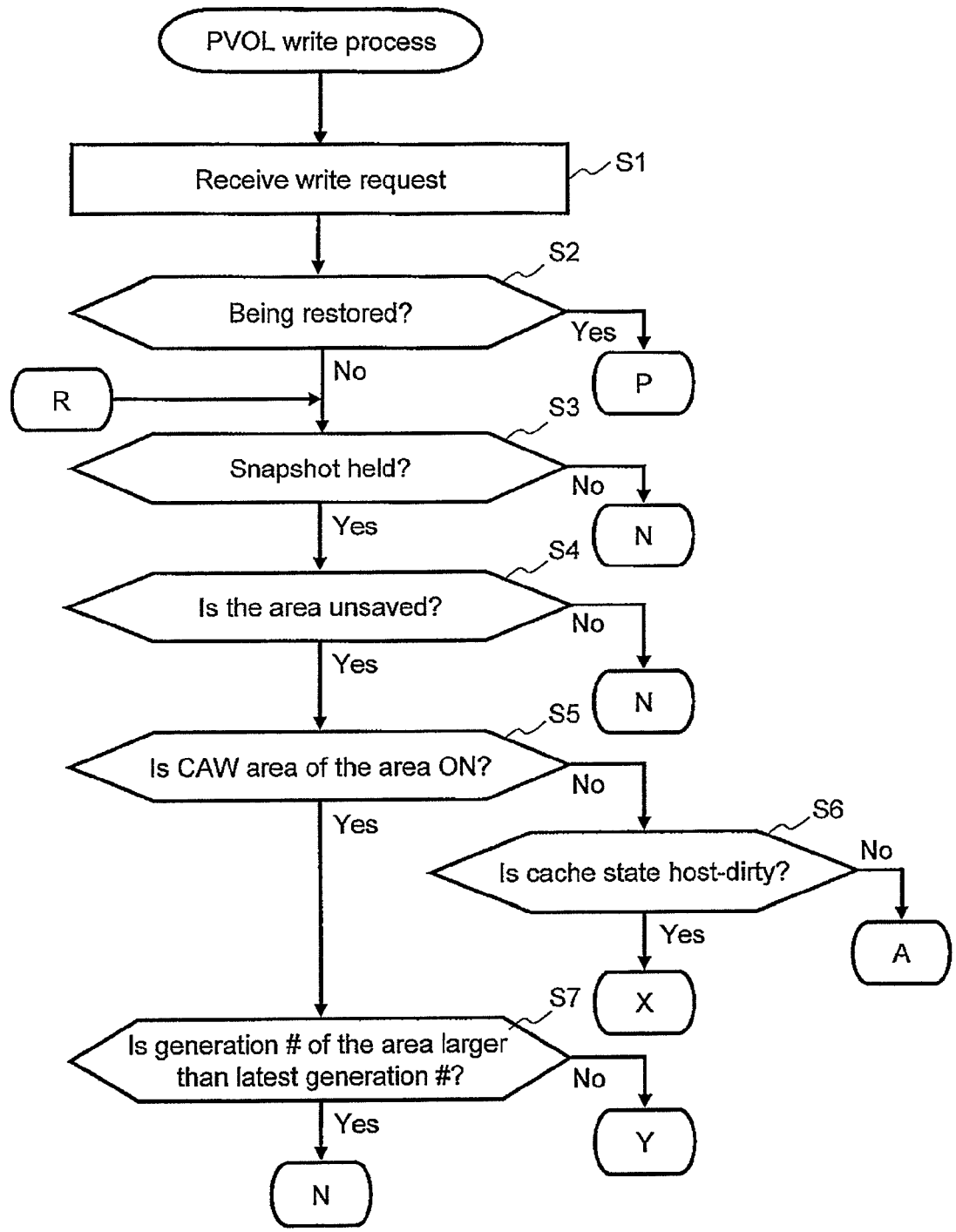
FIG. 36 is a flowchart of a write process for a storage apparatus 1 according to a second embodiment to write data into a PVOL.

FIG. 36 is a flowchart of a write process for the storage apparatus 1 according to the second embodiment to write data into a PVOL. Steps similar to those of the first embodiment are given the same reference numerals, and description will be made mainly on different points.

If, when judging at step S6 whether or not the cache state is host-dirty, the cache state is not host-dirty (step 6: No), the controller 11 advances the process to a point X (FIG. 37).

Figure 38:
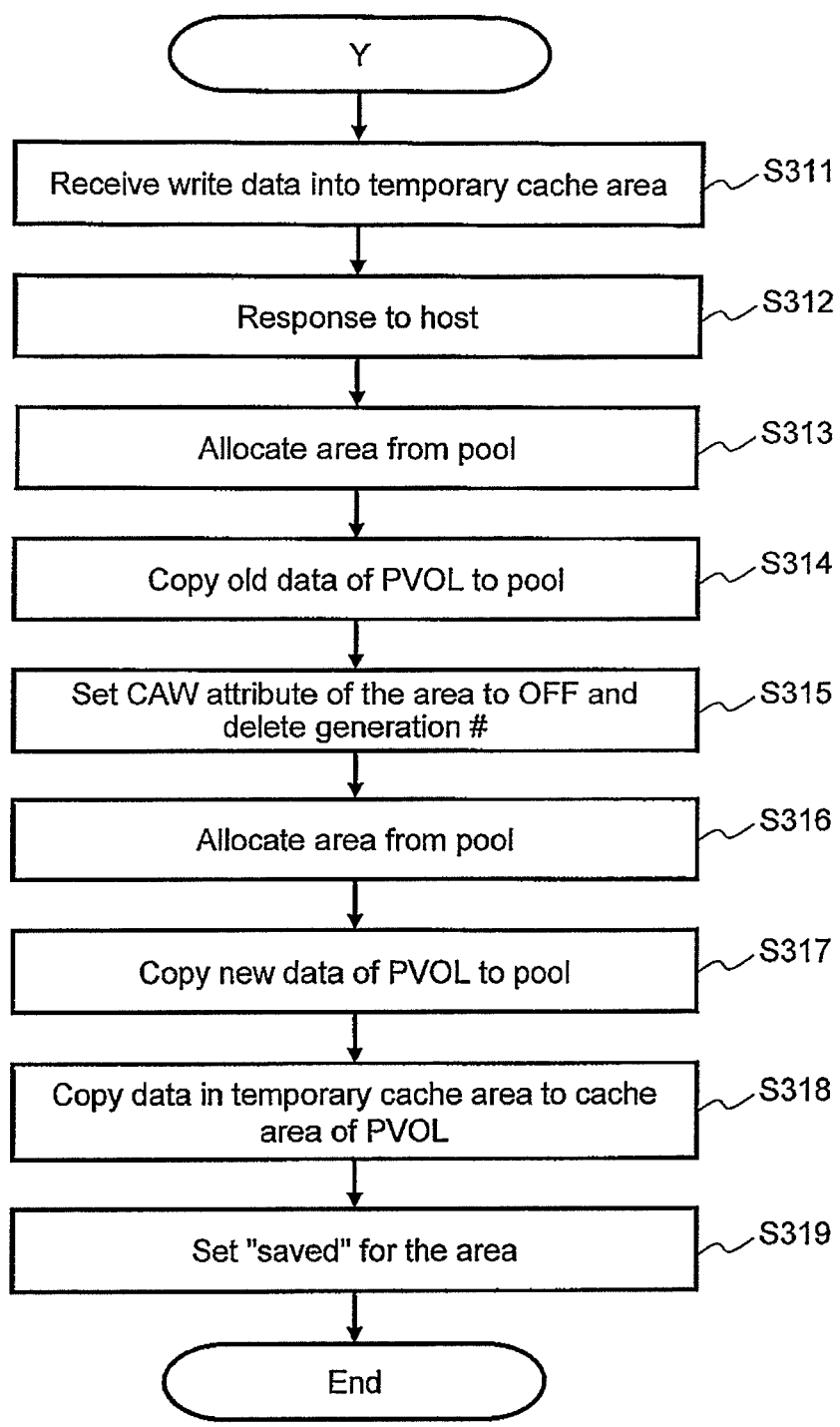
FIG. 38 is a flowchart illustrating a process of a point Y.

If, judging at step S7 whether or not the generation # of the area is larger than the latest generation #, the generation # of the area is equal to or smaller than the latest generation # (step S7: No), the controller 11 advances the process to a point Y (FIG. 38).

Figure 37:
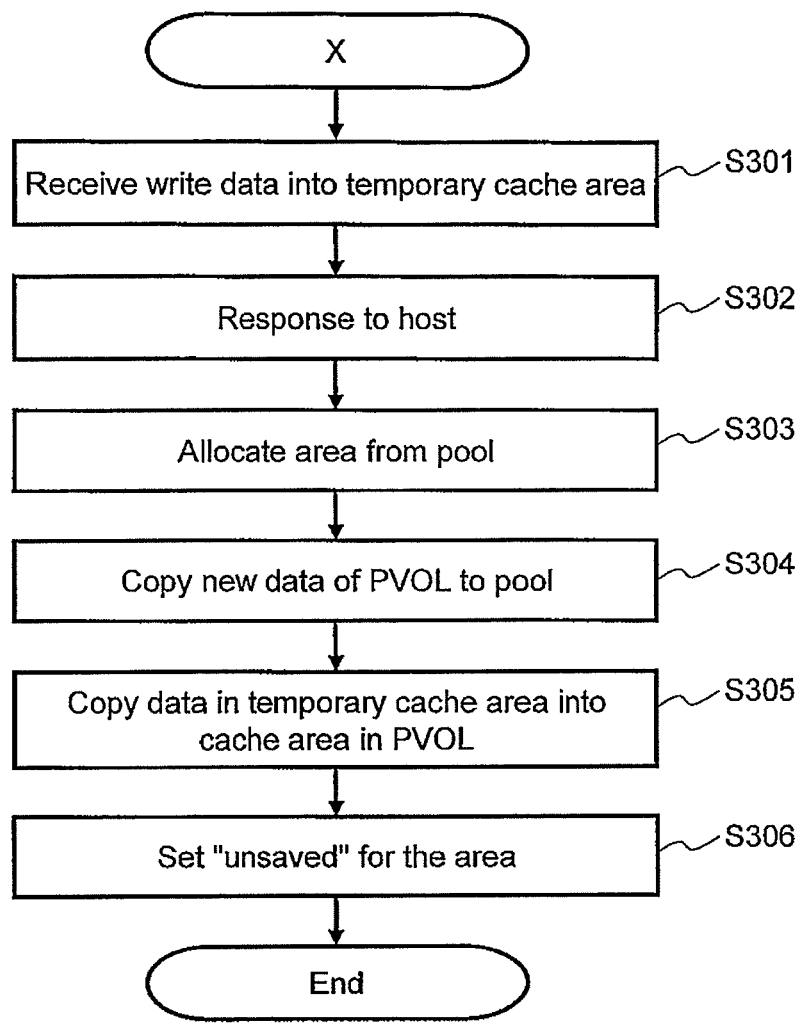
FIG. 37 is a flowchart illustrating a process of a point X.

FIG. 37 is a flowchart illustrating a process of the point X. Each step in FIG. 37 will be described below.

The controller 11 stores the write data into the temporary area 121t in the cache area 121 (step S301) and transmits a response to the write request, to the host 2 (step S302). Thereby, the write response to the host 2 can be improved.

The controller 11 identifies a generation # associated with the writing-destination PVOL area on the basis of the difference area management table 1172, identifies an SVOL of the generation # on the basis of the pair information management table 1171, allocates an area to an SVOL area corresponding to the writing-destination area, from the pool 14, and updates the page management table 1182 in accordance with the allocation (step S303).

The controller 11 copies the data of the PVOL, which is stored in the cache area 121, to the area allocated at step S303 (step S304). If the data stored in the cache area 121 is only a part of the data of a slot, the data of the relevant slot in the PVOL is read out onto the R surface of the cache area 121 to make up for a non-existing part of the data of the slot with the data read out onto the R surface, and then copy the data after the supplementation is copied to the page allocated at step S303.

The controller 11 copies the data in the temporary area 121t to an area for the PVOL in the cache area 121 (step S305) and sets "saved" as the save state of the area in the difference area management table 1172 (step S306).

FIG. 38 is a flowchart illustrating a process of the point Y. Each step in FIG. 38 will be described below.

The controller 11 stores the write data into the temporary area 121t in the cache area 121 (step S311) and transmits a response to the write request, to the host 2 (step S312). Thereby, the write response to the host 2 can be improved.

The controller 11 identifies a generation # associated with the writing-destination PVOL area on the basis of the difference area management table 1172; identifies an SVOL of the generation # minus 1 on the basis of the pair information management table 1171, allocates an area to an SVOL area corresponding to the writing-destination area, from the pool 14, and updates the page management table 1182 in accordance with the allocation (step S313).

The controller 11 copies data of the relevant area stored in the PVOL (old data: data constituting a snapshot of a generation immediately before the current generation) to the area allocated at step S313 (step S314), sets the CAW attribute of the relevant area in the difference area management table 1172 to OFF, and deletes the generation # (step S315).

The controller 11 identifies a generation # associated with the writing-destination PVOL area on the basis of the difference area management table 1172, identifies an SVOL of the generation # on the basis of the pair information management table 1171, allocates a page to an SVOL area corresponding to the writing-destination area, from the pool 14, and updates the page management table 1182 in accordance with the allocation (step S316).

The controller 11 copies the data to be written into the relevant PVOL area (data constituting a snapshot of the current generation), which is stored in the cache area 121, to the page allocated at step S316 (step S317). If the data stored in the cache area 121 is only a part of the data of a slot, the data of the relevant slot in the PVOL is read out onto the R surface of the cache area 121 to make up for a non-existing part of the data of the slot with the data read out onto the R surface, and then copy the data after the supplementation is copied to the page allocated at step S316.

The controller 11 copies the data in the temporary area 121t to an area for the PVOL in the cache area 121 (step S318) and sets "saved" as the save state corresponding to the area in the difference area management table 1172 (step S319).

Third Embodiment

In the first and second embodiments, an example of an operation of creating a snapshot for the purpose of backup has been described. The purpose of a snapshot, however, is not necessarily limited only to backup, and a snapshot may be created for other purposes. In a third embodiment of the present invention, an example of an operation of preferentially saving a snapshot for a purpose other than the purpose of temporary use into an SVOL, paying attention to the fact that a snapshot created for the purpose of temporary use is deleted later.

Figure 39:
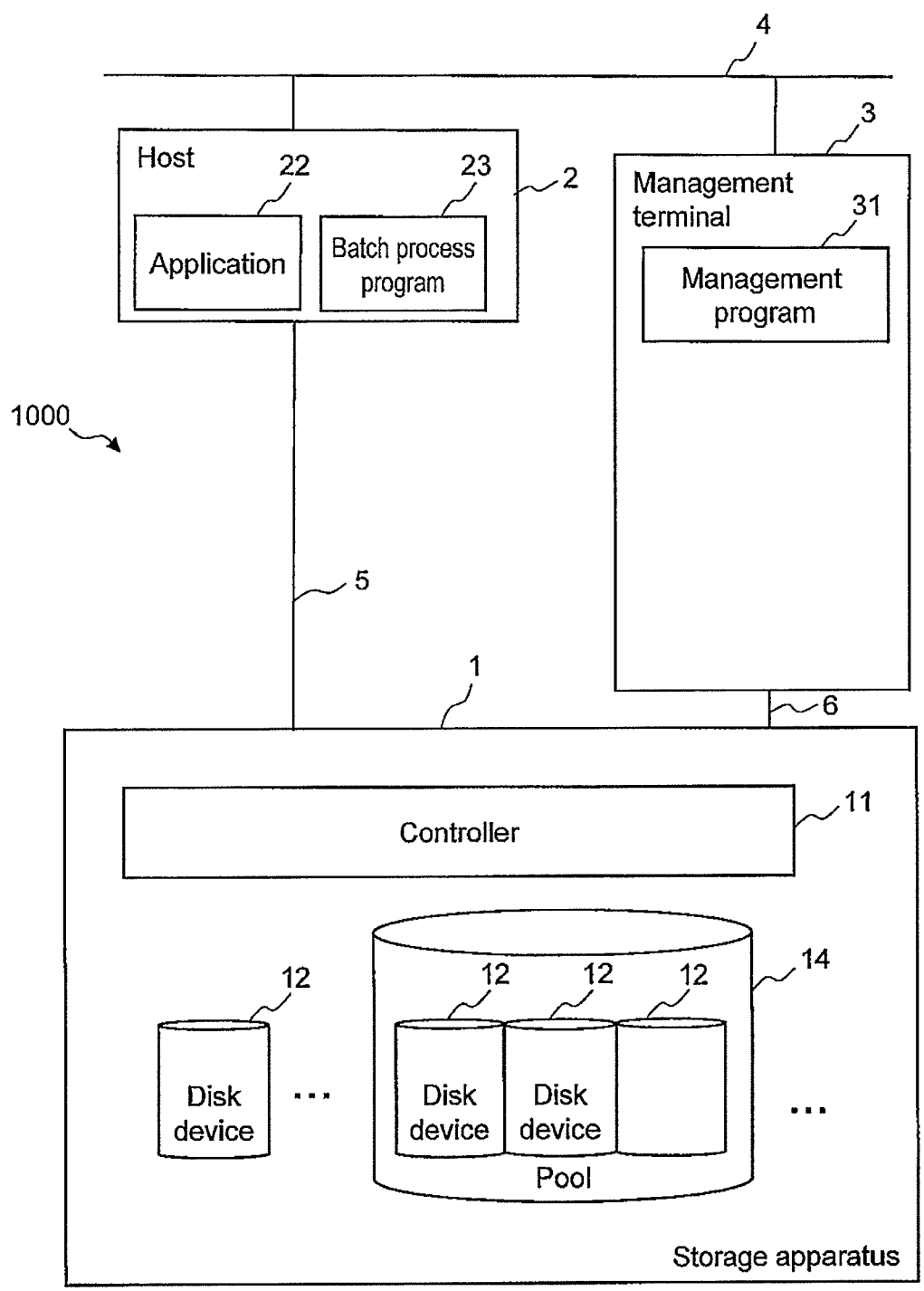
FIG. 39 is a whole configuration diagram of a computer system 1000 according to a third embodiment.

FIG. 39 is a whole configuration diagram of a computer system 1000 according to a third embodiment of the present invention. In the computer system 1000 according to the third embodiment, the management terminal 3 is not provided with the backup server 32. The host 2 is provided with a batch process program 23 instead of the backup agent 21. Since the computer system 1000 is almost similar to that of the first and second the embodiments in other points, description will be made below mainly on the above different points.

The batch process program 23 is a program for analyzing a snapshot at a certain time point stored in the storage apparatus 1. Because this analysis process requires a lot of time, the storage apparatus 1 creates a snapshot for the purpose of temporary use separately from data accessed by the host 2, and the batch process program 23 performs the above analysis process by a batch process using this snapshot for the purpose of temporary use.

FIG. 40 is a diagram illustrating the configuration of the pair information management table 1171 in the third embodiment. In the third embodiment, the pair information management table 1171 holds a temporary attribute instead of the deletion timing described with reference to FIG. 5. The temporary attribute is a flag indicating whether or not a snapshot with a corresponding pair ID has been created for the purpose of temporary use.

Figure 41:
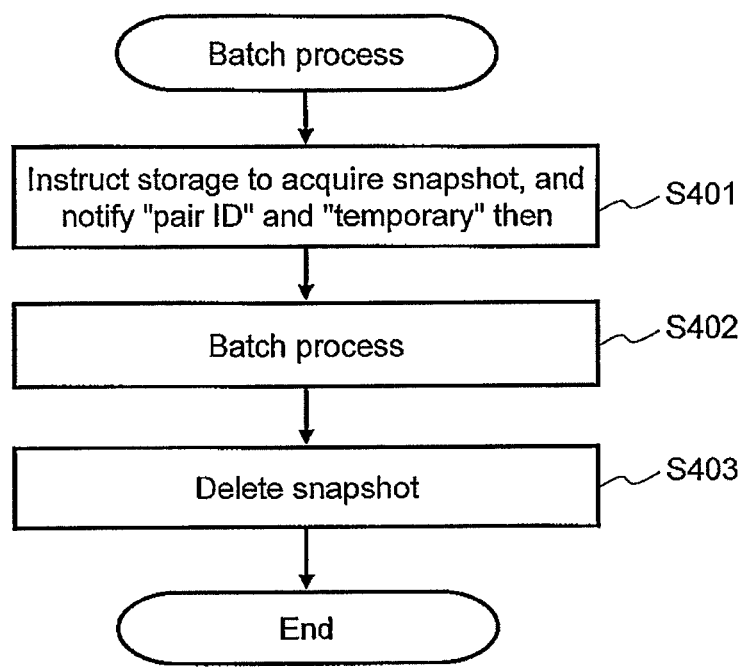
FIG. 41 is a flowchart illustrating the operation of a batch process program 23.

FIG. 41 is a flowchart illustrating the operation of a batch process program 23. Each step in FIG. 41 will be described below.

The batch process program 23 instructs the storage apparatus 1 to create a snapshot for the purpose of temporary use (S401). At this time, the batch process program 23 also notifies a target pair ID and temporary attribute. The storage apparatus 1 creates a snapshot for the purpose of temporary use for the specified pair ID.

When the storage apparatus 1 creates the snapshot for the purpose of temporary use, the batch process program 23 performs the analysis process described above using the snapshot (S402). When the analysis process ends, the batch process program 23 instructs the storage apparatus 1 to delete the snapshot which it instructed the storage apparatus 1 to create at step S401 (S403). The storage apparatus 1 deletes the snapshot.

Figure 42:
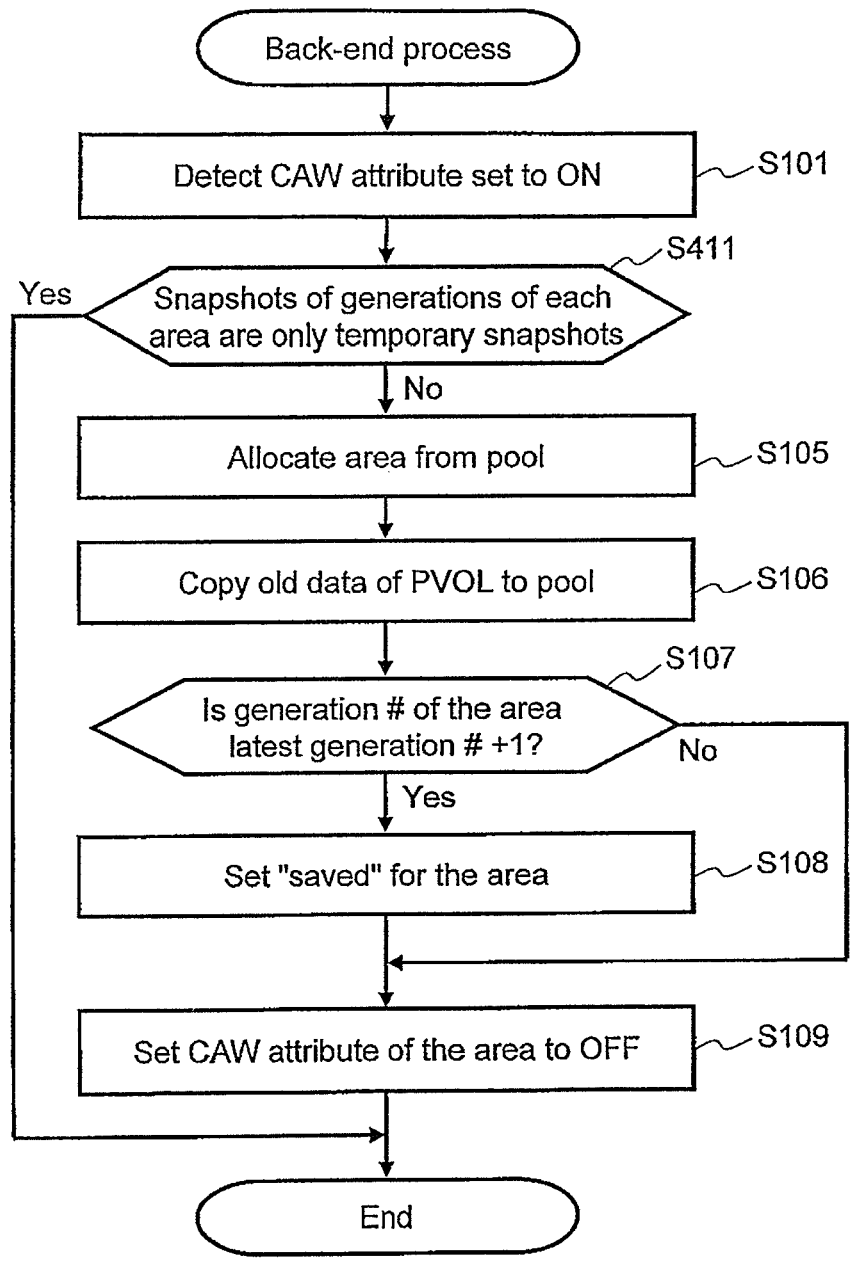
FIG. 42 is a flowchart of a back-end process performed by a storage apparatus 1 according to the third embodiment.

FIG. 42 is a flowchart of a back-end process performed by the storage apparatus 1 according to this third embodiment. This flowchart is similar to FIG. 23 except that steps S102 to S104 in FIG. 23 are replaced with step S411.

(FIG. 42—Step S422)

The controller 11 refers to the pair information management table 1171 and judges, for each of the snapshots corresponding to the areas detected at step S101 including snapshots of old generations, whether or not the snapshot is for the purpose of temporary use (temporary attribute=Yes). If a snapshot which is not for the purpose of temporary use is included in any generation of any area (S411: No), it is necessary to perform save for the area, and save into an SVOL is performed through steps S105 to S109. If snapshots of all generations of all areas are for the purpose of temporary use (S411: Yes), it is not necessary to perform save into an SVOL, and, therefore, steps S105 to S109 are skipped.

(FIG. 42—Step S422: Supplementation)

At this step, the controller 11 regards the temporary attributes in the pair information management table 1171 as deletion priority of snapshots, and preferentially saves a snapshot with a low deletion priority into an SVOL. The reason is that, even if a snapshot for the purpose of temporary use is saved into an SVOL, the save process may be wasteful because the snapshot is deleted by the batch process program 23 at step S403.

Conclusion

As described above, the storage apparatus 1 according to the third embodiment preferentially saves a snapshot which is not for the purpose of temporary use into an SVOL. Thereby, it is possible to reduce the frequency of a process for saving a snapshot into an SVOL, and, therefore, it is possible to suppress occurrence of a situation in which switching to a COW operation is caused and prevent deterioration in I/O performance, similar to the first and second embodiments.

The present invention is not limited to the embodiments described above, and various variations are included. The above embodiments have been described in detail to describe the present invention intelligibly, and the present invention is not limited to such that is provided with all the components described above. A part of components of a certain embodiment can be replaced with components of another embodiment. Furthermore, a component of a certain embodiment can be added with a component of another embodiment. Furthermore, a part of components of each embodiment can be added or replaced with another component or can be deleted.

A part or all of each of the components, functions, processing units, processing means and the like described above may be realized by hardware, for example, by designing it with an integrated circuit. Each of the components, functions and the like described above may be realized by software by a processor interpreting and executing a program which realizes each function. Information, such as programs for realizing the functions, tables and files, can be stored in a recording device such as a memory, a hard disk and an SSD (Solid State Drive) or a recording medium such as an IC card, an SD card and a DVD.

REFERENCE SIGNS LIST 1 storage apparatus
11 controller
111 memory
112 CPU
113 higher interface
114 lower interface
115 interface
116 bridge
117 generation management program
1171 pair information management table
1172 difference area management table
118 pool management program
1181 address management table
1182 page management table
119 copy process program
120 I/O process program
12 disk device
14 pool
2 host computer
21 backup agent
22 application
23 batch process program
3 management terminal
31 management program
32 backup server
321 backup schedule
322 backup catalog
5 and 6 communication network
1000 computer system

The invention claimed is:

1. A storage apparatus storing data accessed by a host computer, the storage apparatus comprising:
   a first storing unit storing the data;
   a second storing unit storing snapshot images of the data stored by the first storing unit;
   a cache memory temporarily storing write data to be written into the first storing unit by the host computer before the write data is stored into the first storing unit;
   a controller writing the write data into the first storing unit; and
   a priority judging unit judging deletion priority of the snapshot images stored in the second storing unit for each of storage areas on the first storing unit corresponding to the snapshot images; wherein
   if an amount of consumption of the cache memory has not reached a predetermined threshold, the controller saves a first snapshot image of data stored in a write-destination storage area of the write data, into the second storing unit after storing the write data onto the cache memory and returning a completion response to the host computer, and then writes the write data stored by the cache memory into the first storing unit;
   if the amount of consumption of the cache memory has reached the pre-determined threshold, the controller saves the first snapshot image of the data stored in the write-destination storage area of the write data, into the second storing unit, and then returns the completion response to the host computer after writing the write data into the first storing unit; and
   in the case of saving the first snapshot image into the second storing unit after returning the completion response to the host computer, the controller performs the saving preferentially for a storage area with a low deletion priority on the first storing unit.

2. The storage apparatus according to claim 1, wherein the priority judging unit acquires scheduled dates and times to delete the snapshots stored by the second storing unit for recreation of the snapshots, at the time when backup for the first storing unit is performed, and judges that the deletion priority of a given storage area on the first storing unit is higher as a date and time acquired by the priority judging unit associated with the given storage area is closer to a current date and time, and performs the saving preferentially for a storage area on the first storing unit that has a low deletion priority.

3. The storage apparatus according to claim 2, wherein the second storing unit stores the snapshot images of multiple generations, each generation comprising one or more snapshot images; and
   the priority judging unit acquires the date and time for each snapshot image generation, and performs the saving for each generation by preferentially selecting a snapshot image has a low deletion priority among the one or more snapshot images of a same generation.

4. The storage apparatus according to claim 2, wherein the priority judging unit receives an execution schedule for the backup from a backup program performing the backup, and identifies the scheduled dates and times on the basis of a backup schedule for each storage area on the first storing unit which is described in the execution schedule.

5. The storage apparatus according to claim 1, wherein the priority judging unit identifies a snapshot image created for the purpose of temporary use, which is created on the second storing unit for a purpose other than backup, and judges that a deletion priority of the snapshot image created for the purpose of temporary use is higher than a deletion priority of a snapshot image created for the purpose of backup and performs the saving preferentially for a storage area on the first storing unit corresponding to the snapshot image created for the purpose of backup.

6. The storage apparatus according to claim 5, wherein the second storing unit stores the snapshot images of multiple generations, each generation comprising one or more snapshot images; and the priority judging unit identifies, for each of the snapshot image generations, whether or not each of the one or more snapshot images has been created for the purpose of temporary use, and performs the saving for each generation preferentially for a snapshot image created for a purpose other than the purpose of temporary use among the snapshot images of a same generation.

7. The storage apparatus according to claim 5, wherein the priority judging unit receives purposes of use of the snapshot images from a process program using the snapshot images for the purpose of temporary use, and judges the priority on the basis of the use purposes.

8. A computer system comprising:

the storage apparatus according to claim 1; and a host computer accessing data stored by the storage apparatus.

9. The computer system according to claim 8, comprising a computer executing a backup program performing backup for the first storing unit, wherein the priority judging unit receives an execution schedule of the backup from the computer executing the backup program, acquires scheduled dates and times to delete the snapshots stored by the second storing unit for recreation of the snapshots, at a time when the backup is performed, on the basis of a backup schedule for each storage area on the first storing unit which is described in the execution schedule, and judges that the deletion priority of a given snapshot of the snapshots stored by the second storing unit is higher as the date and time of the given snapshot acquired by the priority judging unit is closer to a current date and time, and performs the saving preferentially for a storage area on the first storing unit associated with a snapshot that has a low deletion priority.

10. The computer system according to claim 8, comprising a computer executing a process program that uses snapshot images that were created for the purpose of temporary use, wherein the priority judging unit receives purposes of use of the snapshot images from the computer executing the process program, identifies which of the snapshot images were created on the second storing unit for the purpose of temporary use other than backup, on the basis of the received purposes of use, and judges that a deletion priority of a snapshot image created for the purpose of temporary use is higher than a deletion priority of a snapshot image created for the purpose of backup and performs the saving preferentially for a storage area on the first storing unit corresponding to the snapshot image created for the purpose of backup.

11. A method for creating a snapshot in a storage apparatus, the storage apparatus comprising:

a first storing unit storing data accessed by a host computer;

a second storing unit storing snapshot images of the data stored by the first storing unit;

a cache memory temporarily storing write data to be written into the first storing unit by the host computer before the write data is stored into the first storing unit;

a priority judging unit judging deletion priority of the snapshot images stored in the second storing unit for each of storage areas on the first storing unit corresponding to the snapshot images; and the method comprising the steps of:

if an amount of consumption of the cache memory has not reached a predetermined threshold, saving a first snapshot image of data stored in a write-destination storage area of the write data, into the second storing unit after storing the write data onto the cache memory and returning a completion response to the host computer, and then writing the write data stored by the cache memory into the first storing unit;

if the amount of consumption of the cache memory has reached the pre-determined threshold, saving the first snapshot image of the data stored in the write-destination storage area of the write data, into the second storing unit, and then returning the completion response to the host computer after writing the write data into the first storing unit; and in the case of saving the first snapshot image into the second storing unit after returning the completion response to the host computer, performing the saving preferentially for a storage area with a low deletion priority on the first storing unit.

* * * * *